US007969971B2

(12) United States Patent
Gai et al.

(10) Patent No.: US 7,969,971 B2
(45) Date of Patent: *Jun. 28, 2011

(54) ETHERNET EXTENSION FOR THE DATA CENTER

(75) Inventors: Silvano Gai, San Jose, CA (US);
Thomas Edsall, Cupertino, CA (US);
Luca Cafiero, Palo Alto, CA (US);
Davide Bergamasco, Sunnyvale, CA (US);
Dinesh Dutt, Sunnyvale, CA (US);
Flavio Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1776 days.

This patent is subject to a terminal disclaimer.

(21) Appl. No.: 11/084,587

(22) Filed: Mar. 18, 2005

(65) Prior Publication Data

US 2006/0101140 A1    May 11, 2006

Related U.S. Application Data

(60) Provisional application No. 60/621,396, filed on Oct. 22, 2004.

(51) Int. Cl.
*H04L 12/28* (2006.01)
(52) U.S. Cl. .................. 370/389; 370/412; 370/466
(58) Field of Classification Search .................. 370/389, 370/241, 252, 412, 437, 400, 466; 709/238
See application file for complete search history.

(56) References Cited

U.S. PATENT DOCUMENTS 5,402,416 A    3/1995    Cieslak et al.
5,526,350 A    6/1996    Gittins et al.
5,742,604 A    4/1998    Edsall et al. .................. 370/401
5,920,566 A    7/1999    Hendel et al.
(Continued)

FOREIGN PATENT DOCUMENTS

CN    1778079 A    5/2004
(Continued)

OTHER PUBLICATIONS

Sancho et al. ;"Analyzing the Influence of Virtual Lanes on the Performance of Infiniband Networks"; 2002; IEEE Proceedings of the International Parallel and Distributed processing Symposium (IPDPS'02); pp. 1-10.*

(Continued)

*Primary Examiner* — Ricky Ngo
*Assistant Examiner* — DeWanda Samuel
(74) *Attorney, Agent, or Firm* — Weaver Austin Villeneuve & Sampson LLP

(57) ABSTRACT

The present invention provides methods and devices for implementing a Low Latency Ethernet ("LLE") solution, also referred to herein as a Data Center Ethernet ("DCE") solution, which simplifies the connectivity of data centers and provides a high bandwidth, low latency network for carrying Ethernet and storage traffic. Some aspects of the invention involve transforming FC frames into a format suitable for transport on an Ethernet. Some preferred implementations of the invention implement multiple virtual lanes ("VLs") in a single physical connection of a data center or similar network. Some VLs are "drop" VLs, with Ethernet-like behavior, and others are "no-drop" lanes with FC-like behavior. Some preferred implementations of the invention provide guaranteed bandwidth based on credits and VL. Active buffer management allows for both high reliability and low latency while using small frame buffers. Preferably, the rules for active buffer management are different for drop and no drop VLs.

28 Claims, 19 Drawing Sheets

U.S. PATENT DOCUMENTS

| | | | |
|---|---|---|---|
| 5,946,313 A | 8/1999 | Allan et al. | |
| 5,974,467 A | 10/1999 | Haddock et al. | |
| 6,021,124 A | 2/2000 | Haartsen | |
| 6,104,699 A | 8/2000 | Holender et al. | |
| 6,195,356 B1 | 2/2001 | Anello et al. | |
| 6,333,917 B1 | 12/2001 | Lyon et al. | |
| 6,397,260 B1 | 5/2002 | Wils et al. | |
| 6,404,768 B1 | 6/2002 | Basak et al. | |
| 6,456,590 B1 | 9/2002 | Ren et al. | |
| 6,459,698 B1* | 10/2002 | Acharya | 370/392 |
| 6,504,836 B1 | 1/2003 | Li et al. | |
| 6,529,489 B1 | 3/2003 | Kikuchi et al. | |
| 6,556,541 B1 | 4/2003 | Bare | |
| 6,556,578 B1 | 4/2003 | Silberschatz et al. | |
| 6,560,198 B1 | 5/2003 | Ott et al. | |
| 6,587,436 B1 | 7/2003 | Vu et al. | |
| 6,636,524 B1 | 10/2003 | Chen et al. | |
| 6,650,623 B1 | 11/2003 | Varma et al. | |
| 6,671,258 B1 | 12/2003 | Bonneau | |
| 6,721,316 B1 | 4/2004 | Epps et al. | |
| 6,724,725 B1 | 4/2004 | Dreyer et al. | |
| 6,839,794 B1* | 1/2005 | Schober | 710/316 |
| 6,885,633 B1 | 4/2005 | Mikkonen | |
| 6,888,824 B1 | 5/2005 | Fang et al. | |
| 6,901,593 B2 | 5/2005 | Aweya et al. | |
| 6,904,507 B2* | 6/2005 | Gil | 711/170 |
| 6,934,256 B1 | 8/2005 | Jacobson et al. | |
| 6,934,292 B1 | 8/2005 | Ammitzboell | |
| 6,975,581 B1 | 12/2005 | Medina et al. | |
| 6,975,593 B2* | 12/2005 | Collier et al. | 370/236 |
| 6,990,529 B2* | 1/2006 | Yang et al. | 709/235 |
| 6,999,462 B1* | 2/2006 | Acharya | 370/401 |
| 7,016,971 B1* | 3/2006 | Recio et al. | 709/233 |
| 7,020,715 B2 | 3/2006 | Venkataraman | |
| 7,046,631 B1 | 5/2006 | Giroux et al. | |
| 7,046,666 B1 | 5/2006 | Bollay et al. | |
| 7,047,666 B2 | 5/2006 | Hahn et al. | |
| 7,093,024 B2* | 8/2006 | Craddock et al. | 709/238 |
| 7,133,405 B2* | 11/2006 | Graham et al. | 370/392 |
| 7,158,480 B1* | 1/2007 | Firoiu et al. | 370/235 |
| 7,187,688 B2* | 3/2007 | Garmire et al. | 370/428 |
| 7,190,667 B2* | 3/2007 | Susnow et al. | 370/229 |
| 7,197,047 B2 | 3/2007 | Latif et al. | |
| 7,209,478 B2* | 4/2007 | Rojas et al. | 370/360 |
| 7,209,489 B1* | 4/2007 | Bailey et al. | 370/412 |
| 7,221,656 B1 | 5/2007 | Aweya et al. | |
| 7,225,364 B2* | 5/2007 | Carnevale et al. | 714/43 |
| 7,266,122 B1 | 9/2007 | Hogg et al. | |
| 7,266,598 B2* | 9/2007 | Rolia | 709/223 |
| 7,277,391 B1 | 10/2007 | Aweya et al. | |
| 7,286,485 B1 | 10/2007 | Ouellette et al. | |
| 7,319,669 B1* | 1/2008 | Kunz et al. | 370/235 |
| 7,349,334 B2* | 3/2008 | Rider | 370/229 |
| 7,349,336 B2 | 3/2008 | Mathews et al. | |
| 7,359,321 B1* | 4/2008 | Sindhu et al. | 370/230 |
| 7,385,997 B2 | 6/2008 | Gorti et al. | |
| 7,400,590 B1* | 7/2008 | Rygh et al. | 370/254 |
| 7,400,634 B2 | 7/2008 | Higashitaniguchi et al. | |
| 7,406,092 B2* | 7/2008 | Dropps et al. | 370/437 |
| 7,436,845 B1* | 10/2008 | Rygh et al. | 370/413 |
| 7,486,689 B1* | 2/2009 | Mott | 370/412 |
| 7,525,983 B2* | 4/2009 | Dropps et al. | 370/437 |
| 7,529,243 B2 | 5/2009 | Sodder et al. | |
| 7,561,571 B1 | 7/2009 | Lovett et al. | |
| 7,564,789 B2* | 7/2009 | Betker | 370/235 |
| 7,684,326 B2 | 3/2010 | Nation et al. | |
| 7,801,125 B2 | 9/2010 | Kreeger et al. | |
| 7,830,793 B2 | 11/2010 | Gai et al. | |
| 2001/0043564 A1 | 11/2001 | Bloch et al. | |
| 2001/0048661 A1 | 12/2001 | Clear et al. | |
| 2002/0042671 A1 | 4/2002 | Chen et al. | |
| 2002/0046271 A1 | 4/2002 | Huang | |
| 2002/0085493 A1* | 7/2002 | Pekkala et al. | 370/235 |
| 2002/0085565 A1 | 7/2002 | Ku et al. | |
| 2002/0103631 A1 | 8/2002 | Feldmann et al. | |
| 2002/0141427 A1* | 10/2002 | McAlpine | 370/413 |
| 2002/0159385 A1* | 10/2002 | Susnow et al. | 370/229 |
| 2002/0188648 A1 | 12/2002 | Aweya et al. | |
| 2002/0191640 A1 | 12/2002 | Haymes et al. | |
| 2003/0002517 A1 | 1/2003 | Takajitsuko et al. | |
| 2003/0026267 A1 | 2/2003 | Oberman et al. | |
| 2003/0037127 A1 | 2/2003 | Shah et al. | |
| 2003/0037163 A1 | 2/2003 | Kitada et al. | |
| 2003/0061379 A1 | 3/2003 | Craddock et al. | |
| 2003/0084219 A1 | 5/2003 | Yao et al. | |
| 2003/0091037 A1 | 5/2003 | Latif et al. | |
| 2003/0115355 A1 | 6/2003 | Cometto et al. | |
| 2003/0118030 A1 | 6/2003 | Fukuda | |
| 2003/0152063 A1 | 8/2003 | Giese et al. | |
| 2003/0169690 A1 | 9/2003 | Mott | |
| 2003/0193942 A1* | 10/2003 | Gil | 370/389 |
| 2003/0195983 A1* | 10/2003 | Krause | 709/238 |
| 2003/0202536 A1 | 10/2003 | Foster et al. | |
| 2003/0223416 A1 | 12/2003 | Rojas et al. | |
| 2003/0227893 A1 | 12/2003 | Bajic | |
| 2004/0008675 A1 | 1/2004 | Basso et al. | |
| 2004/0013088 A1 | 1/2004 | Gregg | |
| 2004/0013124 A1 | 1/2004 | Peebles et al. | |
| 2004/0024903 A1 | 2/2004 | Costatino et al. | |
| 2004/0032856 A1 | 2/2004 | Sandstrom | |
| 2004/0042448 A1 | 3/2004 | Lebizay et al. | |
| 2004/0042477 A1 | 3/2004 | Bitar et al. | |
| 2004/0076175 A1 | 4/2004 | Patenaude | |
| 2004/0078621 A1 | 4/2004 | Talaugon et al. | |
| 2004/0081203 A1 | 4/2004 | Sodder et al. | |
| 2004/0100980 A1 | 5/2004 | Jacobs et al. | |
| 2004/0120332 A1 | 6/2004 | Hendel | |
| 2004/0156390 A1 | 8/2004 | Prasad et al. | |
| 2004/0196809 A1 | 10/2004 | Dillinger et al. | |
| 2004/0213243 A1 | 10/2004 | Lin et al. | |
| 2004/0240459 A1* | 12/2004 | Lo et al. | 370/412 |
| 2005/0002329 A1 | 1/2005 | Luft et al. | |
| 2005/0018606 A1* | 1/2005 | Dropps et al. | 370/230 |
| 2005/0025179 A1 | 2/2005 | McLaggan et al. | |
| 2005/0138243 A1 | 6/2005 | Tierney et al. | |
| 2005/0141419 A1 | 6/2005 | Bergamasco et al. | |
| 2005/0141568 A1 | 6/2005 | Kwak et al. | |
| 2005/0169188 A1 | 8/2005 | Cometto et al. | |
| 2005/0169270 A1 | 8/2005 | Mutou et al. | |
| 2005/0190752 A1 | 9/2005 | Chiou et al. | |
| 2005/0226149 A1 | 10/2005 | Jacobson et al. | |
| 2005/0238064 A1 | 10/2005 | Winter et al. | |
| 2006/0002385 A1* | 1/2006 | Johnsen et al. | 370/389 |
| 2006/0023708 A1 | 2/2006 | Snively et al. | |
| 2006/0087989 A1 | 4/2006 | Gai et al. | |
| 2006/0098589 A1 | 5/2006 | Kreeger et al. | |
| 2006/0098681 A1 | 5/2006 | Cafiero et al. | |
| 2006/0146832 A1 | 7/2006 | Rampal et al. | |
| 2006/0171318 A1 | 8/2006 | Bergamasco et al. | |
| 2006/0187832 A1 | 8/2006 | Yu | |
| 2006/0198323 A1 | 9/2006 | Finn | |
| 2006/0215550 A1 | 9/2006 | Malhotra | |
| 2006/0251067 A1 | 11/2006 | Desanti et al. | |
| 2007/0041321 A1 | 2/2007 | Sasaki et al. | |
| 2007/0047443 A1 | 3/2007 | Desai et al. | |
| 2007/0081454 A1 | 4/2007 | Bergamasco et al. | |
| 2007/0115824 A1 | 5/2007 | Chandra et al. | |
| 2007/0121617 A1 | 5/2007 | Kanekar et al. | |
| 2007/0183332 A1 | 8/2007 | Oh et al. | |
| 2008/0069114 A1 | 3/2008 | Shimada | |
| 2008/0089247 A1 | 4/2008 | Sane et al. | |
| 2008/0186968 A1 | 8/2008 | Farinacci et al. | |
| 2008/0212595 A1 | 9/2008 | Figueira et al. | |
| 2008/0259798 A1 | 10/2008 | Loh et al. | |
| 2008/0273465 A1 | 11/2008 | Gusat et al. | |
| 2009/0010162 A1 | 1/2009 | Bergamasco et al. | |
| 2009/0052326 A1 | 2/2009 | Bergamasco et al. | |
| 2009/0073882 A1 | 3/2009 | McAlpine et al. | |
| 2009/0232138 A1 | 9/2009 | Gobara et al. | |
| 2009/0252038 A1 | 10/2009 | Cafiero et al. | |

FOREIGN PATENT DOCUMENTS

| | | |
|---|---|---|
| EP | 1206099 | 5/2002 |
| WO | WO2004/064324 | 7/2004 |
| WO | WO 2006/047092 | 5/2006 |
| WO | WO 2006/047109 | 5/2006 |
| WO | WO 2006/047194 | 5/2006 |

| WO | WO 2006/047223 | 5/2006 |
| WO | WO 2006/057730 | 6/2006 |
| WO | WO 2007/050250 | 5/2007 |

OTHER PUBLICATIONS

International Search Report, mailed Oct. 18, 2006, from related International Application PCT/US05/37765, 3 pp. including Notification of Transmittal.
Written Opinion of the International Searching Authority, mailed Oct. 18, 2006, from related International Application PCT/US05/37765, 7 pp.
International Search Report, mailed Nov. 1, 2006 from related International Application No. PCT/US05/36700, 3 pp. including Notification of Transmittal.
Written Opinion of the International Searching Authority, mailed Nov. 1, 2006 from related International Application No. PCT/US05/36700, 5 pp.
International Search Report, dated Sep. 21, 2006 from corresponding International Application No. PCT/US05/37069, 4 pp. including Notification of Transmittal.
Written Opinion of the International Searching Authority, dated Sep. 21, 2006 from corresponding International Application No. PCT/US05/37069, 7 pp.
U.S. Appl. No. 10/777,886, entitled "End-to-End Congestion Control", filed Dec. 18, 2001.
PCT Search Report mailed Sep. 27, 2007 from International Application No. PCT/US06/38858, including Notification of Transmittal, (4 pp.).
PCT Written Opinion mailed Sep. 27, 2007 from International Application No. PCT/US06/38858, including Notification of Transmittal, (4 pp.).
Office Action mailed Jan. 24, 2008 for U.S. Appl. No. 11/152,991.
Office Action mailed Jan. 30, 2008 for U.S. Appl. No. 11/078,992.
Office Action mailed Feb. 21, 2008 for U.S. Appl. No. 11/094,877.
InfiniBand Arch, Spec, vol. 1, Oct. 24, 2000.
InfiniBand Arch, Spec, vol. 2, Oct. 24, 2000.
Ramakrishnan, K. et al., "The Addition of Explicit Congestion Notification (ECN) to IP," RFC 3168, Sep. 2001.
U.S. Appl. No. 60/621,396, filed Oct. 22, 2004.
WIPO International Search Report mailed Jun. 4, 2008 in International Application No. PCT/US2007/066027.
CIPO Office Action mailed Aug. 8, 2008 in Chinese Application No. 200580035946.
CIPO Office Action mailed Jul. 18, 2008 in Chinese Application No. 200580034646.0.
Final Office Action mailed Jul. 7, 2008 for U.S. Appl. No. 11/078,992.
Office Action mailed Jul. 3, 2008 for U.S. Appl. No. 11/400,671.
Office Action mailed Jul. 28, 2008 for U.S. Appl. No. 11/094,877.
Final Office Action mailed Sep. 8, 2008 for U.S. Appl. No. 11/152,991.
Office Action mailed May 29, 2008 for U.S. Appl. No. 11/155,388.
Final Office Action mailed Sep. 15, 2008 for U.S. Appl. No. 11/155,388.
Office Action mailed Oct. 23, 2008 for U.S. Appl. No. 11/078,992.
Final Office Action mailed Dec. 10, 2008 for U.S. Appl. No. 11/094,877.
Written Opinion of the International Searching Authority, mailed Jun. 4, 2008, from International Application No. PCT/US2007/066027.
PCT Search Report mailed May 23, 2008 from International Application No. PCT/US08/051986, including Notification of Transmittal, (4 pp.).
PCT Written Opinion mailed May 23, 2008 from International Application No. PCT/US08/051986, including Notification of Transmittal, (4 pp.).
CIPO Second Office Action mailed Feb. 27, 2009 in Chinese Application No. 200580035946.
CIPO Office Action mailed Apr. 4, 2009, in Application No. 200680032204.
US Office Action mailed Mar. 4, 2009 for U.S. Appl. No. 11/152,991.
US Final Office Action mailed Mar. 17, 2009 for U.S. Appl. No. 11/400,671.
US Notice of Allowance mailed Mar. 23, 2009 in U.S. Appl. No. 11/078,992.
US Office Action mailed Apr. 7, 2009 for U.S. Appl. No. 11/094,877.
US Office Action mailed May 14, 2009, 2009 for U.S. Appl. No. 11/248,933.
U.S. Office Action mailed Jun. 22, 2009 for U.S. Appl. No. 11/400,671.
Notice of Allowance issued May 29, 2009 for U.S. Appl. No. 11/155,388.
U.S. Office Action mailed Apr. 15, 2009 for U.S. Appl. No. 11/670,544.
Cisco Systems, Inc., "Cisco data Center Network Architecture and Solutions Overview," http://www.cisco.com/application/pdf/en/us/guest/netsol/ns377/c643/cdccont_0900aecd802c9a4f.pdf, 2006.
F. Kamoun, et al., "Analysis of Shared Finite Storage in a Computer Network Node Environment Under General Traffic Conditions", IEEE Transactions on Communications, Jul. 1990.
A.K. Choudry, et al., "Dynamic Queue Length Thresholds for Shared-Memory Packet Switches", IEEE/ACM Transactions on Networking, Apr. 1998.
A.K. Choudry, et al., "A New Buffer Management Scheme for Hierarchical Shared Memory Switches", IEEE/ACM Transactions on Networking, 26 pp., 1997.
J. Mandavi, et al., "IPPM Metrics for Measuring Connectivity", RFC 2678, pp. 1-9, Sep. 1999.
J. Postel, "Internet Control Message Protocol, DARPA Internet Program Protocol Specification", RFC 792, pp. 1-15, Sep. 1981.
Wei Cao Huawei Technologies: "IEEE 802.1ah Mode for Ethernet Over MPLS; draft-cao-pwe3-801-1ah-00.txt" IETF Standard-Working-Draft, Internet Engineering Task Force, IETF, CH, Oct. 16, 2006, XP015047518 ISSN: 000-0004.
International Search Report and Written Opinion, dated Oct. 15, 2008, from PCT/US08/069154.
CN Office Action mailed Jul. 31, 2009, in Chinese Application No. 200580034647.5.
CN Second Office Action mailed Jan. 15, 2010, in Chinese Application No. 200580034646.0.
EPO Extended Search Report mailed Jul. 16, 2009, in EP Application No. 05810244.3.
EPO Office Action mailed Oct. 1, 2009, in EP Application No. 05810244.3.
EPO Extended Search Report mailed Jul. 13, 2009, in EP Application No. 05810800.2.
EPO Office Action mailed Oct. 19, 2009, in EP Application No. 05810800.2.
EPO Search Report mailed Mar. 19, 2010, in EP Application No. 08728248.9.
US Office Action mailed Dec. 9, 2009 in related U.S. Appl. No. 11/400,671.
US Office Action mailed Nov. 4, 2009 in related U.S. Appl. No. 11/094,877.
US Notice of Allowance mailed Apr. 23, 2010 in related U.S. Appl. No. 11/094,877.
US Final Office Action mailed Aug. 18, 2009 in related U.S. Appl. No. 11/152,991.
US Notice of Allowance mailed Dec. 31, 2009 in related U.S. Appl. No. 11/152,991.
US Notice of Allowance mailed Jul. 19, 2009 in related U.S. Appl. No. 11/155,388.
US Final Office Action mailed Dec. 28, 2009 in related U.S. Appl. No. 11/248,933.
US Final Office Action mailed Oct. 22, 2009 in related U.S. Appl. No. 11/670,544.
US Office Action mailed Oct. 19, 2009 in related U.S. Appl. No. 11/825,631.
US Office Action mailed Oct. 19, 2009 in related U.S. Appl. No. 11/842,866.
US Final Office Action mailed Apr. 2, 2010 in related U.S. Appl. No. 11/842,866.
US Final Office Action mailed Jun. 11, 2010 in related U.S. Appl. No. 11/400,671.

US Notice of Allowance mailed Jun. 28, 2010 in related U.S. Appl. No. 11/094,877.
US Notice of Allowance mailed May 17, 2010 in related U.S. Appl. No. 11/152,991.
CN Third Office Action mailed Aug. 11, 2010, in Chinese Application No. 200580034647.5.
CN Office Action mailed Aug. 11, 2010, in Chinese Application No. 200580034955.8.
US Notice of Allowance mailed Oct. 8, 2010 in related U.S. Appl. No. 11/248,933.
US Office Action mailed Oct. 29, 2010 in related U.S. Appl. No. 11/825,631.
US Office Action mailed Oct. 29, 2010 in related U.S. Appl. No. 11/842,866.
CN Office Action mailed Feb. 12, 2010, in Chinese Application No. 200580034955.8.
US Office Action mailed May 13, 2010 in related U.S. Appl. No. 11/248,933.
US Office Action mailed Apr. 28, 2010 in related U.S. Appl. No. 11/825,631.
CN Second Office Action mailed Feb. 5, 2010, in Chinese Application No. 200580034647.5.
*IEEE Standards 802.3™—2002*, IEEE Computer Society, Mar. 8, 2002, 1513 pages.
*MAC Control PAUSE Operation*, 31B.3.1 Transmit Operation, Annex 31B, IEEE Std 802.3ae—2002, 4 pages.
*IEEE Standards 802.3ah198—2004*, IEEE Computer Society, Sep. 7, 2004, 623 pages.
*MAC Control PAUSE Operation*, 31B.1 PAUSE description, Annex 31B, IEEE Std 802.3, 1998 Edition, 11 pages.
*IEEE Standards 802.3ak™—2004*, IEEE Computer Society, Mar. 1, 2004, 42 pages.
*31. MAC Control*, IEEE Std 802.3—2002, Section Two, 9 pages.
Mekkittikul et al., *A Practical Scheduling Algorithm to Achieve 100% Throughput in Input-Queued Switches*, Computer Systems Laboratory, Stanford University, 8 pages.
J. Moy, OSPF Version 2 (RFC 2178), Network Working Group, Cascade Communications Corp., Jul. 1997, 211 pp.
Floyd et al., *Random Early Detection Gateways for Congestion Avoidance*, Lawrence Berkeley Laboratory, Univ. of California, IEEE/ACM Transactions on Networking, Aug. 1993, 22 pages.
"InfiniBand" from Wikipedia, downloaded Feb. 16, 2007 from the internet at http://en.wikipedia.org/wiki/InfiniBand 3 pp.
International Search Report, mailed Jan. 16, 2007, from related International Application No. PCT/US05/37239, including Notification of Transmittal; and Written Opinion of the International Searching Authority, mailed Jan. 16, 2007, from related International Application No. PCT/US05/37239, 14 pp total.
International Search Report, mailed Feb. 20, 2007, from related International Application No. PCT/US05/37651, including Notification of Transmittal; and Written Opinion of the International Searching Authority, mailed Feb. 20, 2007, from related International Application No. PCT/US05/37651, 7 pp total.

* cited by examiner

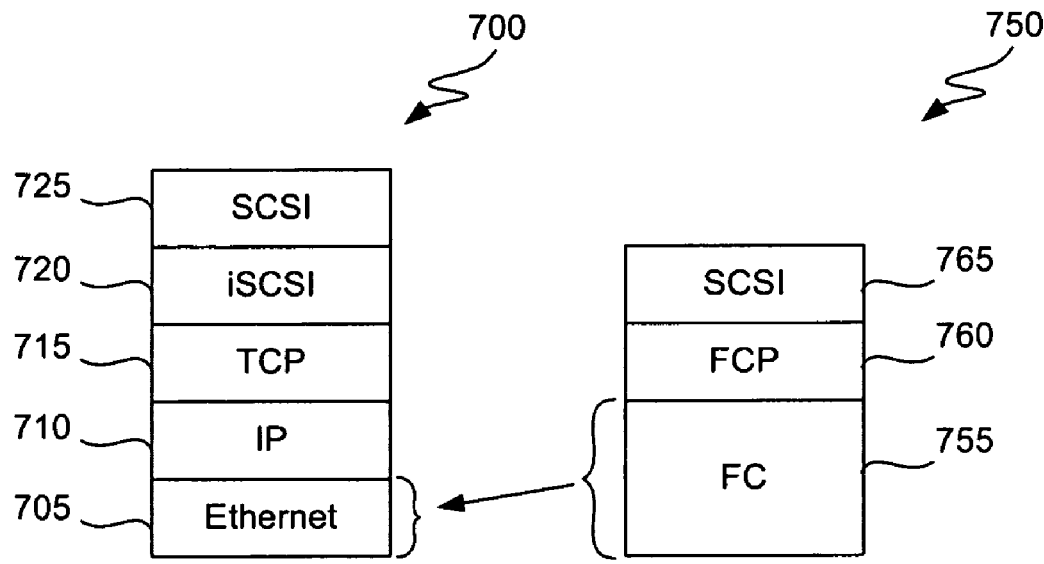
*FIG. 7A*  *FIG. 7B*
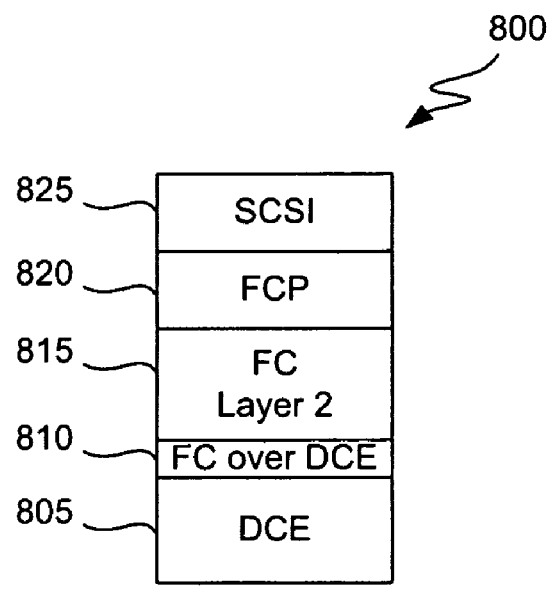
*FIG. 8*

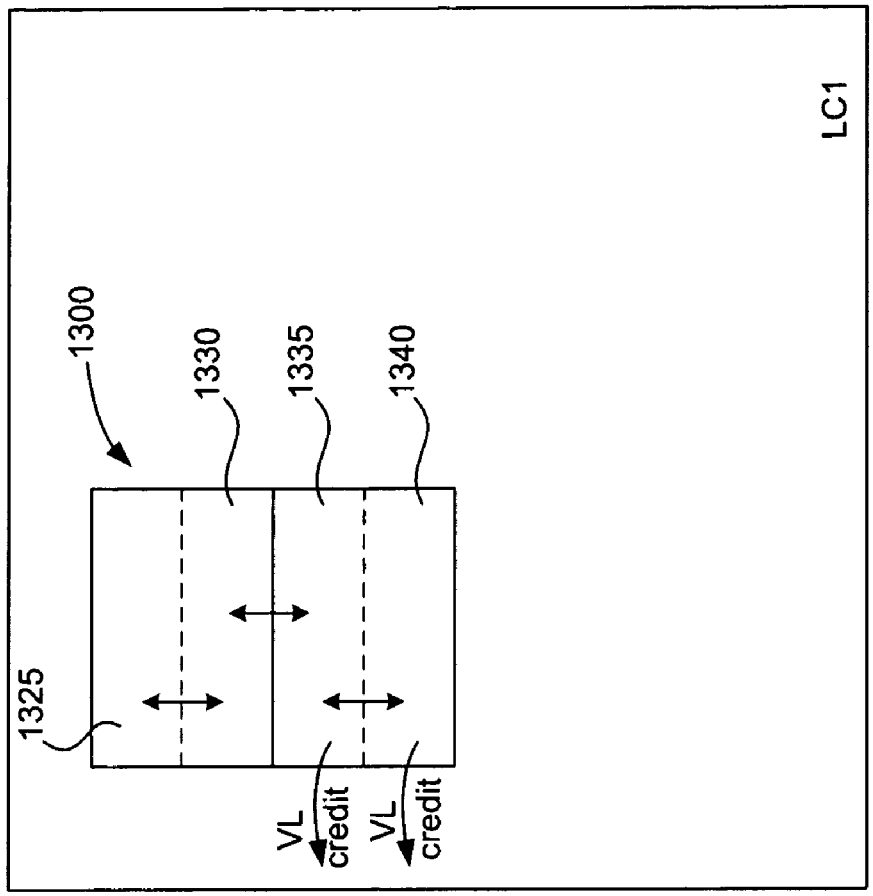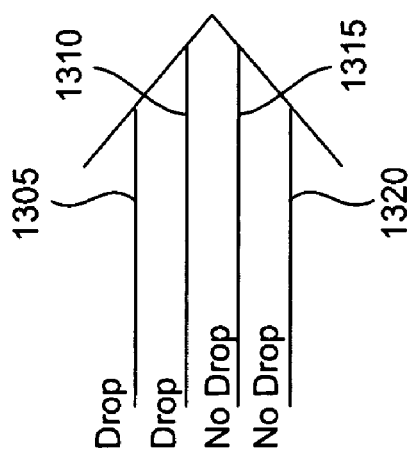
FIG. 13

ETHERNET EXTENSION FOR THE DATA CENTER

CROSS-REFERENCE TO RELATED APPLICATIONS

This application claims priority to U.S. Provisional Application No. 60/621,396, entitled "FC Over Ethernet" and filed on Oct. 22, 2004, which is hereby incorporated by reference in its entirety. This application is related to U.S. patent application Ser. No. 11/078,992, entitled "Fibre Channel Over Ethernet" and filed on Mar. 10, 2005, which is also hereby incorporated by reference in its entirety.

BACKGROUND OF THE INVENTION

FIG. 1 depicts a simplified version of a data center of the general type that an enterprise that requires high availability and network storage (e.g., a financial institution) might use. Data center 100 includes redundant Ethernet switches with redundant connections for high availability. Data center 100 is connected to clients via network 105 via a firewall 115. Network 105 may be, e.g., an enterprise Intranet, a DMZ and/or the Internet. Ethernet is well suited for TCP/IP traffic between clients (e.g., remote clients 180 and 185) and a data center.

Within data center 105, there are many network devices. For example, many servers are typically disposed on racks having a standard form factor (e.g., one "rack unit" would be 19" wide and about 1.25" thick). A "Rack Unit" or "U" is an Electronic Industries Alliance (or more commonly "EIA") standard measuring unit for rack mount type equipment. This term has become more prevalent in recent times due to the proliferation of rack mount products showing up in a wide range of commercial, industrial and military markets. A "Rack Unit" is equal to 1.75" in height. To calculate the internal useable space of a rack enclosure you would simply multiply the total amount of Rack Units by 1.75". For example, a 44 U rack enclosure would have 77" of internal usable space (44×1.75). Racks within a data center may have, e.g., about 40 servers each. A data center may have thousands of servers, or even more. Recently, some vendors have announced "blade servers," which allow even higher-density packing of servers (on the order of 60 to 80 servers per rack).

However, with the increasing numbers of network devices within a data center, connectivity has become increasingly complex and expensive. At a minimum, the servers, switches, etc., of data center 105 will typically be connected via an Ethernet. For high availability, there will be at least 2 Ethernet connections, as shown in FIG. 1.

Moreover, it is not desirable for servers to include a significant storage capability. For this reason and other reasons, it has become increasingly common for enterprise networks to include connectivity with storage devices such as storage array 150. Historically, storage traffic has been implemented over SCSI (Small Computer System Interface) and/or FC (Fibre Channel).

In the mid-1990's SCSI traffic was only able to go short distances. A topic of key interest at the time was how to make SCSI go "outside the box." Greater speed, as always, was desired. At the time, Ethernet was moving from 10 Mb/s to 100 Mb/s. Some envisioned a future speed of up to 1 Gb/s, but this was considered by many to be nearing a physical limit. With 10 Mb/s Ethernet, there were the issues of half duplex and of collisions. Ethernet was considered to be somewhat unreliable, in part because packets could be lost and because there could be collisions. (Although the terms "packet" and "frame" have somewhat different meanings as normally used by those of skill in the art, the terms will be used interchangeably herein.) FC was considered to be an attractive and reliable option for storage applications, because under the FC protocol packets are not intentionally dropped and because FC could already be run at 1 Gb/s. However, during 2004, both Ethernet and FC reached speeds of 10 Gb/s. Moreover, Ethernet had evolved to the point that it was full duplex and did not have collisions. Accordingly, FC no longer had a speed advantage over Ethernet. However congestion in a switch may cause Ethernet packets to be dropped and this is an undesirable feature for storage traffic.

During the first few years of the $21^{st}$ century, a significant amount of work went into developing iSCSI, in order to implement SCSI over a TCP/IP network. Although these efforts met with some success, iSCSI has not become very popular: iSCSI has about 1%-2% of the storage network market, as compared to approximately 98%-99% for FC.

One reason is that the iSCSI stack is somewhat complex as compared to the FC stack. Referring to FIG. 7A, it may be seen that iSCSI stack 700 requires 5 layers: Ethernet layer 705, IP layer 710, TCP layer 715, iSCSI layer 720 and SCSI layer 725. TCP layer 715 is a necessary part of the stack because Ethernet layer 705 may lose packets, but yet SCSI layer 725 does not tolerate packets being lost. TCP layer 715 provides SCSI layer 725 with reliable packet transmission. However, TCP layer 715 is a difficult protocol to implement at speeds of 1 to 10 Gb/s. In contrast, because FC does not lose frames, there is no need to compensate for lost frames by a TCP layer or the like. Therefore, as shown in FIG. 7B, FC stack 750 is simpler, requiring only FC layer 755, FCP layer 760 and SCSI layer 765.

Accordingly, the FC protocol is normally used for communication between servers on a network and storage devices such as storage array 150. Therefore, data center 105 includes FC switches 140 and 145, provided by Cisco Systems, Inc. in this example, for communication between servers 110 and storage array 150.

1 RU and Blade Servers are very popular because they are relatively inexpensive, powerful, standardized and can run any of the most popular operating systems. It is well known that in recent years the cost of a typical server has decreased and its performance level has increased. Because of the relatively low cost of servers and the potential problems that can arise from having more than one type of software application run on one server, each server is typically dedicated to a particular application. The large number of applications that is run on a typical enterprise network continues to increase the number of servers in the network.

However, because of the complexities of maintaining various types of connectivity (e.g., Ethernet and FC connectivity) with each server, each type of connectivity preferably being redundant for high availability, the cost of connectivity for a server is becoming higher than the cost of the server itself. For example, a single FC interface for a server may cost as much as the server itself. A server's connection with an Ethernet is typically made via a network interface card ("NIC") and its connection with an FC network is made with a host bus adaptor ("HBA").

The roles of devices in an FC network and a Ethernet network are somewhat different with regard to network traffic, mainly because packets are routinely dropped in response to congestion in a TCP/IP network, whereas frames are not intentionally dropped in an FC network. Accordingly, FC will sometimes be referred to herein as one example of a "no-drop" network, whereas Ethernet will be referred to as one manifestation of a "drop" network. When packets are dropped on a TCP/IP network, the system will recover quickly, e.g., in a few hundred microseconds. However, the protocols for an FC network are generally based upon the assumption that frames will not be dropped. Therefore, when frames are dropped on an FC network, the system does not recover quickly and SCSI may take minutes to recover.

Currently, a port of an Ethernet switch may buffer a packet for up to about 100 milliseconds before dropping it. As 10 Gb/s Ethernet is implemented, each port of an Ethernet switch would need approximately 100 MB of RAM in order to buffer a packet for 100 milliseconds. This would be prohibitively expensive.

For some enterprises, it is desirable to "cluster" more than one server, as indicated by the dashed line around servers S2 and S3 in FIG. 1. Clustering causes an even number of servers to be seen as a single server. For clustering, it is desirable to perform remote direct memory access ("RDMA"), wherein the contents of one virtual memory space (which may be scattered among many physical memory spaces) can be copied to another virtual memory space without CPU intervention. The RDMA should be performed with very low latency. In some enterprise networks, there is a third type of network that is dedicated to clustering servers, as indicated by switch 175. This may be, for example, a "Myrinet," a "Quadrix" or an "Infiniband" network.

Therefore, clustering of servers can add yet more complexity to data center networks. However, unlike Quadrix and Myrinet, Infiniband allows for clustering and provides the possibility of simplifying a data center network. Infiniband network devices are relatively inexpensive, mainly because they use small buffer spaces, copper media and simple forwarding schemes.

However, Infiniband has a number of drawbacks. For example, there is currently only one source of components for Infiniband switches. Moreover, Infiniband has not been proven to work properly in the context of, e.g., a large enterprise's data center. For example, there are no known implementations of Infiniband routers to interconnect Infiniband subnets. While gateways are possible between Infiniband and Fibre Channel and Infiniband to Ethernet, it is very improbable that Ethernet will be removed from the datacenter. This also means that the hosts would need not only an Infiniband connection, but also an Ethernet connection.

Accordingly, even if a large enterprise wished to ignore the foregoing shortcomings and change to an Infiniband-based system, the enterprise would need to have a legacy data center network (e.g., as shown in FIG. 1) installed and functioning while the enterprise tested an Infiniband-based system. Therefore, the cost of an Infiniband-based system would not be an alternative cost, but an additional cost.

It would be very desirable to simplify data center networks in a manner that would allow an evolutionary change from existing data center networks. An ideal system would provide an evolutionary system for consolidating server I/O and providing low latency and high speed at a low cost.

SUMMARY OF THE INVENTION

The present invention provides methods and devices for implementing a Low Latency Ethernet ("LLE") solution, also referred to herein as a Data Center Ethernet ("DCE") solution, which simplifies the connectivity of data centers and provides a high bandwidth, low latency network for carrying Ethernet and storage traffic. Some aspects of the invention involve transforming FC frames into a format suitable for transport on an Ethernet. Some preferred implementations of the invention implement multiple virtual lanes ("VLs") (also referred to as virtual links) in a single physical connection of a data center or similar network. Some VLs are "drop" VLs, with Ethernet-like behavior, and others are "no-drop" lanes with FC-like behavior.

A VL may be implemented, in part, by tagging a frame. Because each VL may have its own credits, each VL may be treated independently from other VLs. We can even determine the performance of each VL according to the credits assigned to the VL, according to the replenishment rate. To allow a more complex topology and to allow better management of a frame inside a switch, TTL information may be added to a frame as well as a frame length field. There may also be encoded information regarding congestion, so that a source may receive an explicit message to slow down.

Some preferred implementations of the invention provide guaranteed bandwidth based on credits and VL. Different VLs may be assigned different guaranteed bandwidths that can change over time. Preferably, a VL will remain a drop or no drop lane, but the bandwidth of the VL may be dynamically changed depending on the time of day, tasks to be completed, etc.

Active buffer management allows for both high reliability and low latency while using small frame buffers, even with 10 GB/s Ethernet. Preferably, the rules for active buffer management are applied differently for drop and no drop VLs. Some embodiments of the invention are implemented with copper media instead of fiber optics. Given all these attributes, I/O consolidation may be achieved in a competitive, relatively inexpensive fashion.

Some aspects of the invention provide a method for carrying more than one type of traffic on a single physical link. The method includes these steps: logically partitioning traffic on a physical link into a plurality of virtual lanes; applying a first set of rules to first traffic on a first virtual lane; and applying a second set of rules to second traffic on a second virtual lane. However, some implementations of the invention involve more than two virtual lanes. Accordingly, the method can include the steps of applying third through Nth sets of rules to traffic on third through Nth virtual lanes.

The method can include the step of differentiating service per virtual lane. As used herein, the term "differentiating service" or the like means causing service to differ based on factors that include, but are not limited to, guaranteed minimum bandwidth and/or other indicia of quality of service ("QoS"), access control and other related security measures, etc.

The traffic carried on the virtual lanes may be, for example, Ethernet traffic, storage traffic and/or some form of Inter Process Communication ("IPC") traffic, including but not limited to cluster or inter-cluster traffic such as RDMA traffic.

In some implementations of the method, the first set of rules causes frames to be dropped in response to latency but the second set of rules does not cause frames to be dropped in response to latency. However, the second set of rules may nonetheless cause frames to be dropped in order to avoid deadlocks. The rules may apply a probabilistic drop function in response to latency.

The first and/or the second set of rules may cause an explicit congestion notification to be transmitted in response to latency. The explicit congestion notification may be sent to a source device or an edge device and may be sent via a data frame or a control frame.

The method may involve implementing flow control per virtual lane, e.g., by using one or more of a buffer-to-buffer crediting scheme and PAUSE frames. The buffer-to-buffer crediting scheme may involve crediting according frame size or by a number of frames (e.g., on a frame-by-frame basis). The buffer-to-buffer credits may be indicated via one of a data frame or a control frame.

Alternative aspects of the invention provide another method of transporting a plurality of traffic types on a single virtual link. The method includes these steps: receiving a first frame on a physical link; inspecting one or more fields of the first frame; determining, based on the one or more fields, that first virtual lane rules should apply to the first frame; and applying the first virtual lane rules to the first frame.

The method may also include these steps: receiving a second frame on a physical link; inspecting one or more fields of the second frame; determining, based on the one or more fields, that second virtual lane rules should apply to the second frame; and applying the second virtual lane rules to the second frame. The first virtual lane rules may include a first set of active buffer management rules and wherein the second virtual lane rules may include a second set of active buffer management rules. The first virtual lane rules and the second virtual lane rules may differentiate service per virtual lane.

The determining step may involve parsing explicit or implicit virtual lane identification information. The determining step may involve mapping implicit virtual lane identification information with a corresponding virtual lane. For example, the VLAN-ID space may be partitioned into virtual lanes, with and each VLAN belonging to a single virtual lane. By parsing the VLAN-ID in a frame, the corresponding virtual lane ID may be determined.

Other methods of transporting a plurality of traffic types on a single virtual link are provided by the present invention. One such method involves initializing a physical link between a first switch port and a second switch port and determining whether the frame contains information required for establishing virtual lanes on the physical link. The method may already include the step of logically partitioning traffic on the physical link into a plurality of virtual lanes when it is determined that the frame contains information required for establishing virtual lanes on the physical link. The method may also include the step of establishing a standard Ethernet connection on the physical link when it is determined that the frame does not contain information required for establishing virtual lanes on the physical link.

Some embodiments of the invention provide a network device. The network device includes a plurality of ports, each port configured for communication on one of a plurality of physical links. The network device also includes a plurality of line cards. Each line card is configured to do the following: logically partition traffic on a physical link into a plurality of virtual lanes; apply a first set of rules to first traffic on a first virtual lane; and apply a second set of rules to second traffic on a second virtual lane.

The methods described herein may be implemented and/or manifested in various ways, including as hardware, software or the like.

BRIEF DESCRIPTION OF THE DRAWINGS

The invention may best be understood by reference to the following description taken in conjunction with the accompanying drawings, which are illustrative of specific implementations of the present invention.

FIG. 7A depicts an iSCSI stack.

FIG. 7B depicts a stack for implementing SCSI over FC.

FIG. 8 depicts a stack for implementing SCSI over DCE according to some aspects of the invention.

FIG. 13 is a block diagram that illustrates buffer management per VL according to some implementations of the invention.

DETAILED DESCRIPTION OF THE PREFERRED EMBODIMENTS

Figure 1:
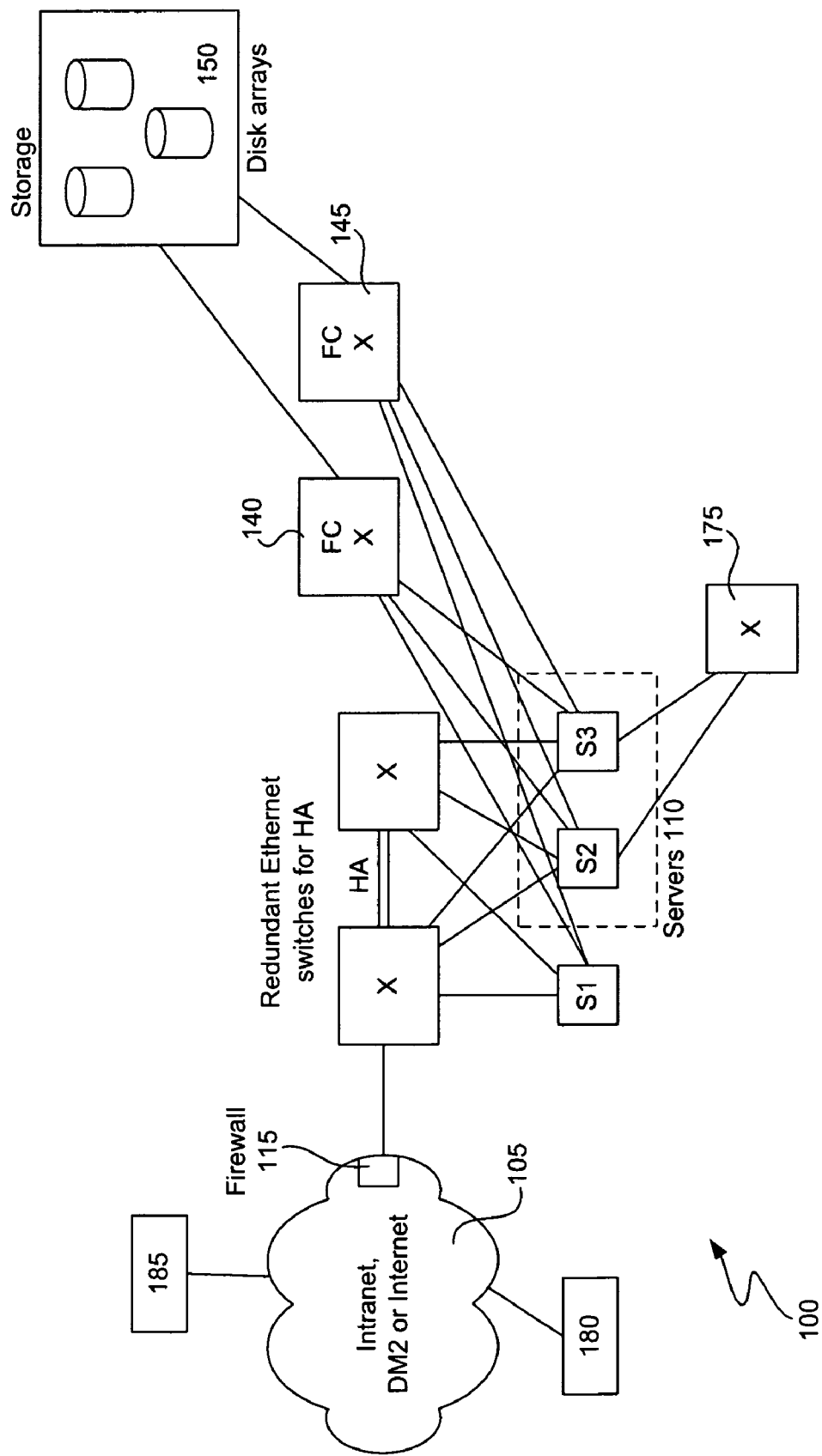
FIG. 1 is a simplified network diagram that depicts a data center.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

The present invention provides methods and devices for simplifying the connectivity of data centers and providing a high bandwidth, low latency network for carrying Ethernet and storage traffic. Some preferred implementations of the invention implement multiple VLs in a single physical connection of a data center or similar network. Buffer-to-buffer credits are maintained, preferably per VL. Some VLs are "drop" VLs, with Ethernet-like behavior, and others are "no-drop" lanes with FC-like behavior.

Some implementations provide intermediate behaviors between "drop" and "no-drop." Some such implementations are "delayed drop," wherein frames are not immediately dropped when a buffer is full, but instead there is an upstream "push back" for a limited time (e.g., on the order of milliseconds) before dropping a frame. Delayed drop implementations are useful for managing transient congestion.

Preferably, a congestion control scheme is implemented at layer 2. Some preferred implementations of the invention provide guaranteed bandwidth based on credits and VL. An alternative to the use of credits is the use of the standard IEEE 802.3 PAUSE frame per VL to implement the "no drop" or "delayed drop" VLs. The IEEE 802.3 standard is hereby incorporated by reference for all purposes. For example, Annex 31B of the 802.3ae-2002 standard, entitled "MAC Control PAUSE Operation," is specifically incorporated by reference. It is also understood that this invention will work in the absence of VLs but in that case the overall link will assume either a "drop" or "delayed drop" or "no drop" behavior.

Preferred implementations support a negotiation mechanism, for example one such as is specified by IEEE 802.1x, which is hereby incorporated by reference. The negotiation mechanism can, e.g., determine whether a host device supports LLE and, if so, allow the host to receive VL and credit information, e.g., how many VLs are supported, does a VL uses credit or pause, if credits how many credits, which is the behavior of each individual VL.

Active buffer management allows for both high reliability and low latency while using small frame buffers. Preferably, the rules for active buffer management are applied differently for drop and no drop VLs.

Some implementations of the invention support an efficient RDMA protocol that is particularly useful for clustering implementations. In some implementations of the invention, network interface cards ("NICs") implement RDMA for clustering applications and also implement a reliable transport for RDMA. Some aspects of the invention are implemented via user APIs from the User Direct Access Programming Library ("uDAPL"). The uDAPL defines a set of user APIs for all RDMA-capable transports and is hereby incorporated by reference.

Figure 2:
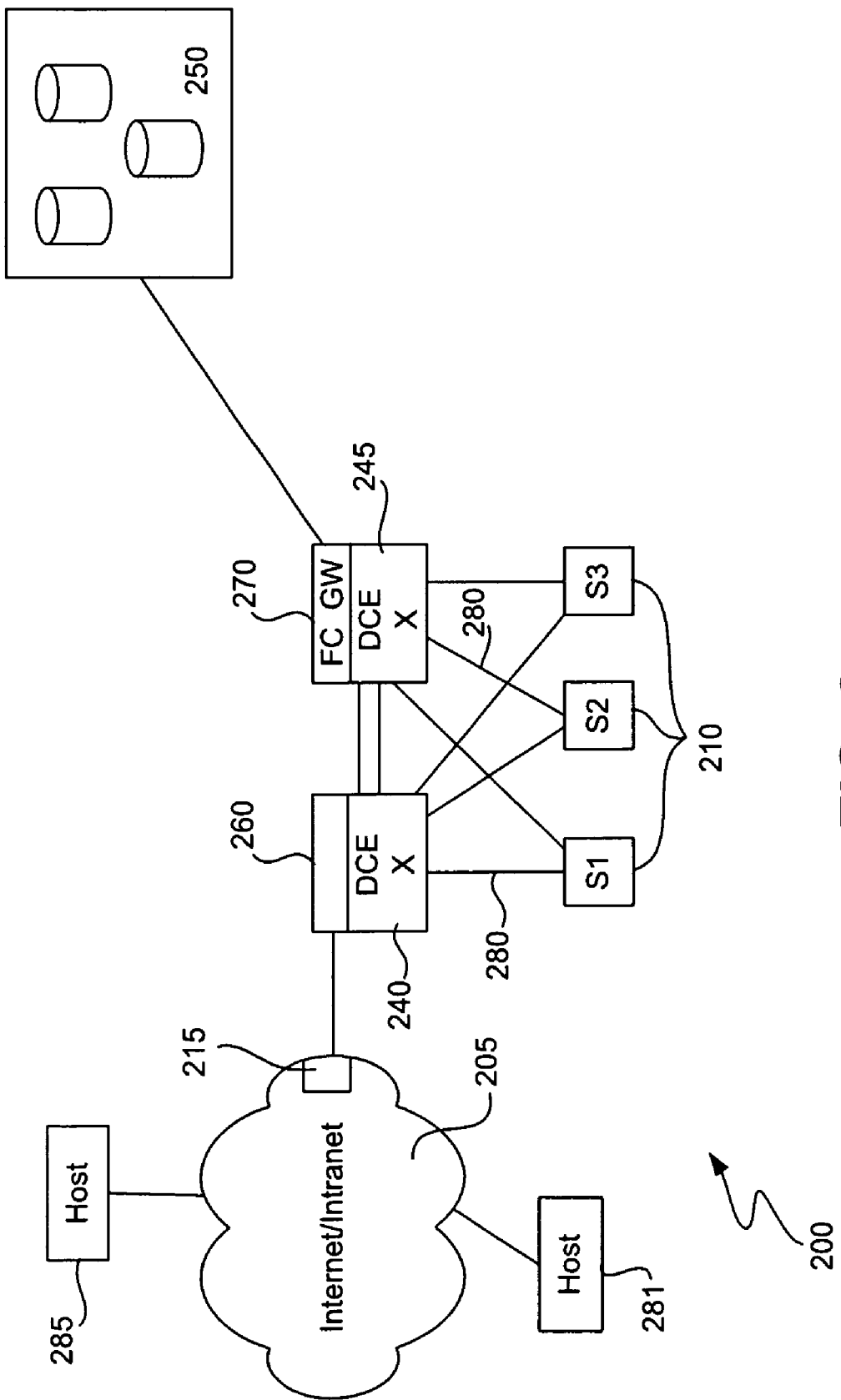
FIG. 2 is a simplified network diagram that depicts a data center according to one embodiment of the invention.

FIG. 2 is a simplified network diagram that illustrates one example of an LLE solution for simplifying the connectivity of data center 200. Data center 200 includes LLE switch 240, having router 260 for connectivity with TCP/IP network 205 and host devices 280 and 285 via firewall 215. The architecture of exemplary LLE switches is set forth in detail herein. Preferably, the LLE switches of the present invention can run 10 Gb/s Ethernet and have relatively small frame buffers. Some preferred LLE switches support only layer 2 functionality.

Although LLE switches of the present invention can be implemented using fiber optics and optical transceivers, some preferred LLE switches are implemented using copper connectivity to reduce costs. Some such implementations are implemented according to the proposed IEEE 802.3ak standard called 10Base-CX4, which is hereby incorporated by reference for all purposes. The inventors expect that other implementations will use the emerging standard IEEE P802.3an (10GBASE-T), which is also incorporated by reference for all purposes.

Servers 210 are also connected with LLE switch 245, which includes FC gateway 270 for communication with disk arrays 250. FC gateway 270 implements FC over Ethernet, which will be described in detail herein, thereby eliminating the need for separate FC and Ethernet networks within data center 200. Gateway 270 could be a device such as Cisco Systems' MDS 9000 IP Storage Service Module that has been configured with software for performing some methods of the present invention. Ethernet traffic is carried within data center 200 as native format. This is possible because LLE is an extension to Ethernet that can carry FC over Ethernet and RDMA in addition to native Ethernet.

Figure 3:
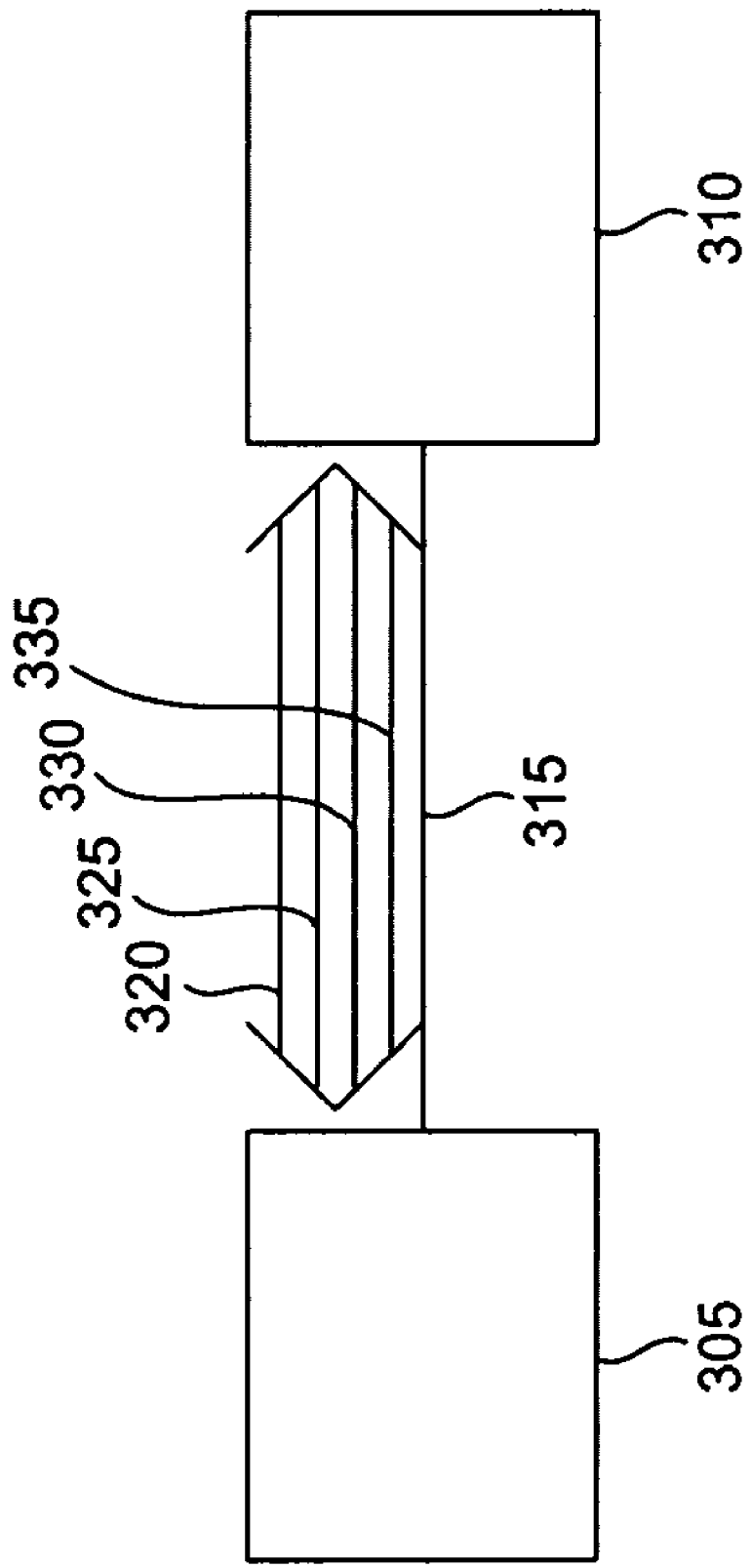
FIG. 3 is a block diagram that depicts multiple VLs implemented across a single physical link.

FIG. 3 illustrates two switches 305 and 310 connected by a physical link 315. The behavior of switches 305 and 310 is generally governed by IEEE 802.1 and the behavior of physical link 315 is generally governed by IEEE 802.3. In general, the present invention provides for two general behaviors of LLE switches, plus a range of intermediate behaviors. The first general behavior is "drop" behavior, which is similar to that of an Ethernet. The general behavior is "no drop" behavior, which is similar to that of FC. Intermediate behaviors between "drop" and "no drop" behaviors, including but not limited to the "delayed drop" behavior described elsewhere herein, are also provided by the present invention.

In order to implement both behaviors on the same physical link 315, the present invention provides methods and devices for implementing VLs. VLs are a way to carve out a physical link into multiple logical entities such that traffic in one of the VLs is unaffected by the traffic on other VLs. This is done by maintaining separate buffers (or separate portions of a physical buffer) for each VL. For example, it is possible to use one VL to transmit control plane traffic and some other high priority traffic without being blocked because of low priority bulk traffic on another VL. VLANs may be grouped into different VLs such that traffic in one set of VLANs can proceed unimpeded by traffic on other VLANs.

In the example illustrated by FIG. 3, switches 305 and 310 are effectively providing 4 VLs across physical link 315. Here, VLs 320 and 325 are drop VLs and VLs 330 and 335 are no drop VLs. In order to simultaneously implement both "drop" behavior and "no drop" behavior, there must be at least one VL assigned for each type of behavior, for a total of 2. (It is theoretically possible to have only one VL that is temporarily assigned to each type of behavior, but such an implementation is not desirable.) To support legacy devices and/or other devices lacking LLE functionality, preferred implementations of the invention support a link with no VL and map all the traffic of that link into a single VL at the first LLE port. From a network management perspective, it is preferable to have between 2 and 16 VLs, though more could be implemented.

It is preferable to dynamically partition the link into VLs, because static partitioning is less flexible. In some preferred implementations of the invention, dynamic partitioning is accomplished on a packet-by-packet basis (or a frame-by-frame basis), e.g., by adding an extension header. The present invention encompasses a wide variety of formats for such a header. In some implementations of the invention, there are two types of frames sent on a DCE link: these types are data frames and link management frames.

Figure 4:
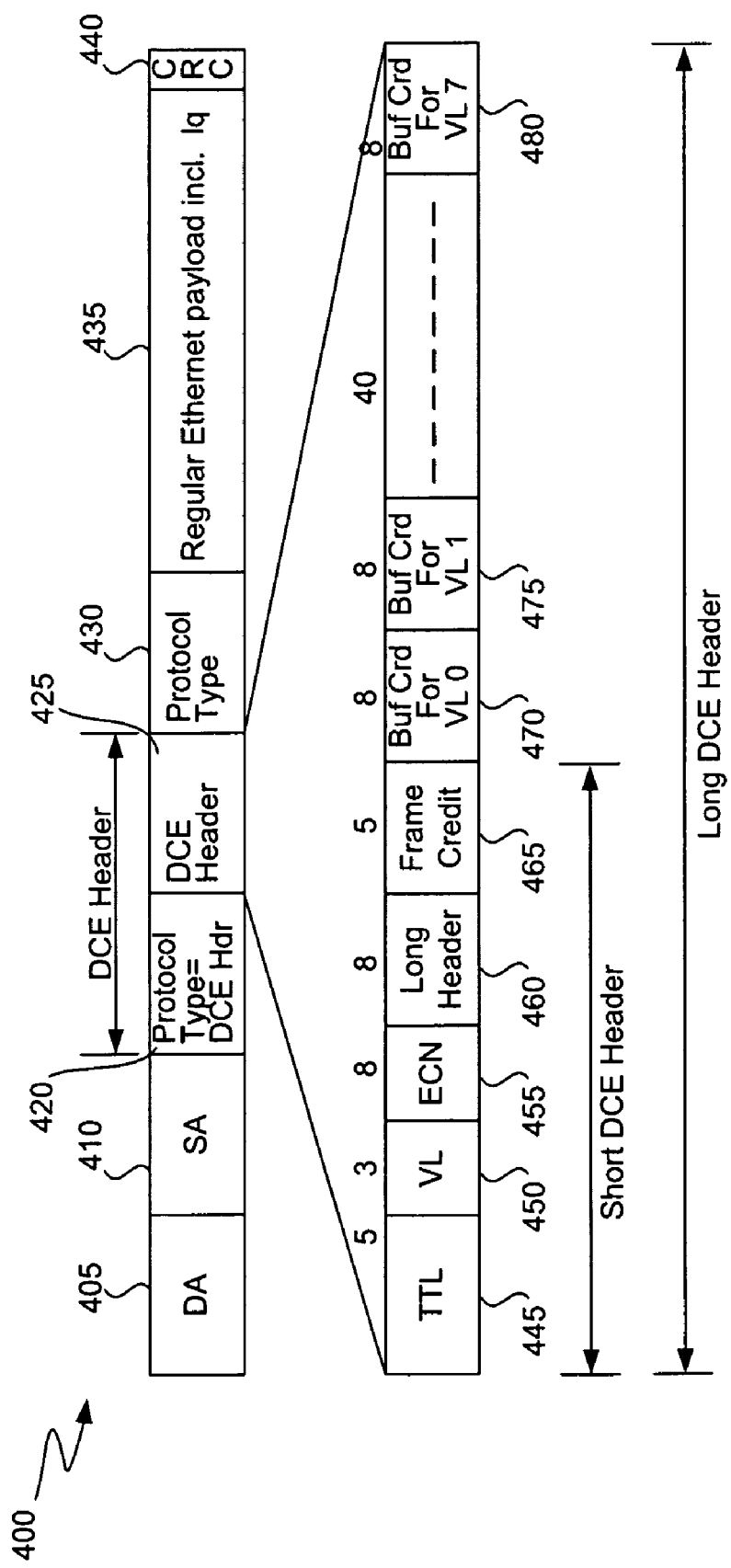
FIG. 4 illustrates one format of an Ethernet frame that carries additional fields for implementing DCE according to some implementations of the invention.
Figure 5:
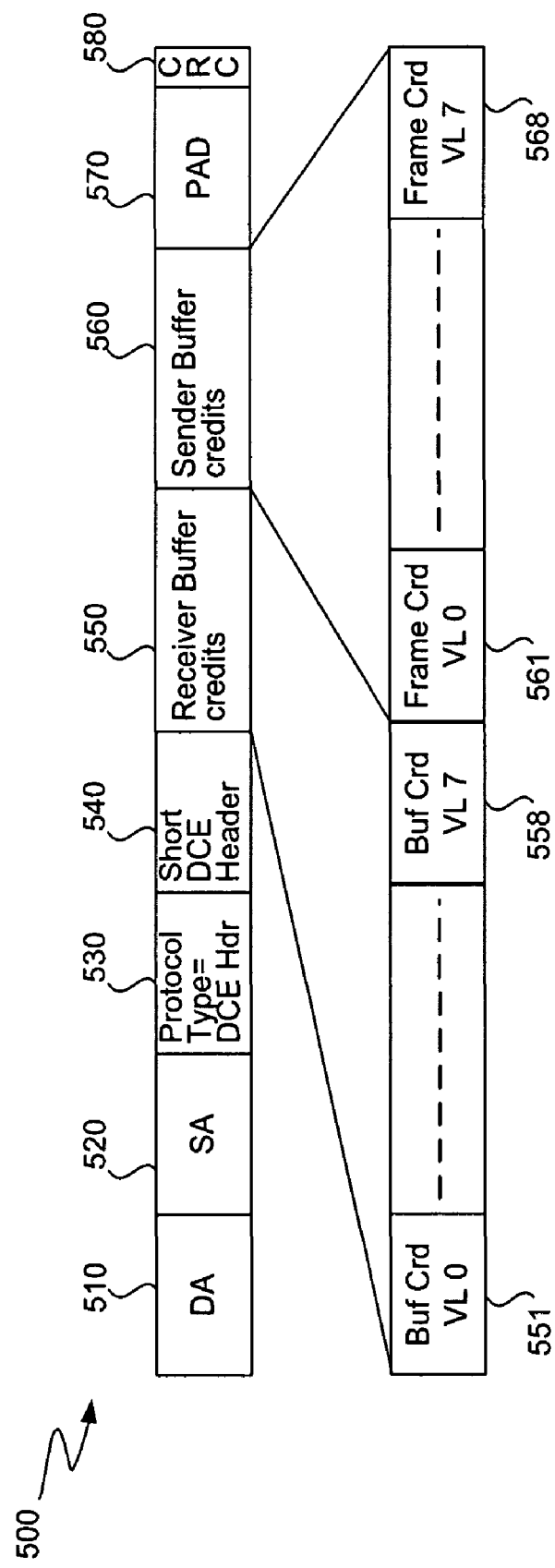
FIG. 5 illustrates one format of a link management frame according to some implementations of the invention.

Although FIGS. 4 and 5 illustrate formats for an Ethernet data frame and a link management frame, respectively, for implementing some aspects of the invention, alternative implementations of the invention provide frames with more or fewer fields, in a different sequence and other variations. Fields 405 and 410 of FIG. 4 are standard Ethernet fields for the frame's destination address and source address, respectively. Similarly, protocol type field 430, payload 435 and CRC field 440 may be those of a standard Ethernet frame.

However, protocol type field 420 indicates that the following fields are those of DCE header 425. If present, the DCE header will preferably be as close as possible to the beginning of the frame, as it enables easy parsing in hardware. The DCE header may be carried in Ethernet data frames, as shown in FIG. 4, as well as in link management frames (see FIG. 5 and the corresponding discussion). This header is preferably stripped by the MAC and does not need to be stored in a frame buffer. In some implementations of the invention, a continuous flow of link management frames is generated when there is no data traffic present or if regular frames cannot be sent due to lack of credits.

Most information carried in the DCE header is related to the Ethernet frame in which the DCE header is contained. However, some fields are buffer credit fields that are used to replenish credit for the traffic in the opposite direction. In this example, buffer credit fields are only carried by frames having a long DCE header. The credit fields may not be required if the solution uses the Pause frames instead of credits.

TTL field 445 indicates a time to live, which is a number decremented each time frame 400 is forwarded. Normally, a Layer 2 network does not require a TTL field. Ethernet uses a spanning tree topology, which is very conservative. A spanning tree puts constraints on the active topology and allows only one path for a packet from one switch to another.

In preferred implementations of the invention, this limitation on the active topology is not followed. Instead, it is preferred that multiple paths are active at the same time, e.g. via a link state protocol such as OSPF (Open Shortest Path First) or IS-IS (Intermediate System to Intermediate System). However, link state protocols are known to cause transient loops during topology reconfiguration. Using a TTL or similar feature ensures that transient loops do not become a major problem. Therefore, in preferred implementations of the invention, a TTL is encoded in the frame in order to effectively implement a link state protocol at layer 2. Instead of using a link state protocol, some implementations of the invention use multiple spanning trees rooted in the different LLE switches and obtain a similar behavior.

Field 450 identifies the VL of frame 400. Identification of the VL according to field 450 allows devices to assign a frame to the proper VL and to apply different rules for different VLs. As described in detail elsewhere herein, the rules will differ according to various criteria, e.g., whether a VL is a drop or a no drop VL, whether the VL has a guaranteed bandwidth, whether there is currently congestion on the VL and other factors.

ECN (explicit congestion notification) field 455 is used to indicate that a buffer (or a portion of a buffer allocated to this VL) is being filled and that the source should slow down its transmission rate for the indicated VL. In preferred implementations of the invention, at least some host devices of the network can understand the ECN information and will apply a shaper, a/k/a a rate limiter, for the VL indicated. Explicit congestion notification can occur in at least two general ways. In one method, a packet is sent for the express purpose of sending an ECN. In another method, the notification is "piggy-backed" on a packet that would have otherwise been transmitted.

As noted elsewhere, the ECN could be sent to the source or to an edge device. The ECN may originate in various devices of the DCE network, including end devices and core devices. As discussed in more detail in the switch architecture section below, congestion notification and responses thereto are important parts of controlling congestion while maintaining small buffer sizes.

Some implementations of the invention allow the ECN to be sent upstream from the originating device and/or allow the ECN to be sent downstream, then back upstream. For example, the ECN field 455 may include a forward ECN portion ("FECN") and a backward ECN portion ("BECN"). When a switch port experiences congestion, it can set a bit in the FECN portion and forward the frame normally. Upon receiving a frame with the FECN bit set, an end station sets the BECN bit and the frame is sent back to the source. The source receives the frame, detects that the BECN bit has been set and decreases the traffic being injected into the network, at least for the VL indicated.

Frame credit field 465 is used to indicate the number of credits that should be allocated for frame 400. There are many possible ways to implement such a system within the scope of the present invention. The simplest solution is to credit for an individual packet or frame. This may not be the best solution from a buffer management perspective: if a buffer is reserved for a single credit and a credit applies to each packet, an entire buffer is reserved for a single packet. Even if the buffer is only the size of an expected full-sized frame, this crediting scheme will often result in a low utilization of each buffer, because many frames will be smaller than the maximum size. For example, if a full-sized frame is 9 KB and all buffers are 9 KB, but the average frame size is 1500 bytes, only about ⅙ of each buffer is normally in use.

A better solution is to credit according to a frame size. Although one could make a credit for, e.g., a single byte, in practice it is preferable to use larger units, such as 64 B, 128 B, 256 B, 512 B, 1024 B, etc. For example, if a credit is for a unit of 512 B, the aforementioned average 1500-byte frame would require 3 credits. If such a frame were transmitted according to one such implementation of the present invention, frame credit field 465 would indicate that the frame requires 3 credits.

Crediting according to frame size allows for a more efficient use of buffer space. Knowing the size of a packet not only indicates how much buffer space will be needed, but also indicates when a packet may be moved from the buffer. This may be particularly important, for example, if the internal transmission speed of a switch differs from the rate at which data are arriving at a switch port.

This example provides a longer version and a shorter version of the DCE header. Long header field 460 indicates whether or not the DCE header is a long or a short version. In this implementation, all data frames contain at least a short header that includes TTL, VL, ECN, and Frame Credit information in fields 445, 450, 455 and 465, respectively. A data frame may contain the long header if it needs to carry the credit information associated with each VL along with the information present in the short header. In this example, there are 8 VLs and 8 corresponding fields for indicating buffer credits for each VL. The use of both short and long DCE headers reduces the overhead of carrying credit information in all frames.

When there is no data frame to be sent, some embodiments of the invention cause a link management frame ("LMF") to be sent to announce credit information. An LMF may also be used to carry buffer credit from a receiver or to carry transmitted frame credit from a Sender. An LMF should be sent uncredited (Frame Credit=0) because it is preferably consumed by the port and not forwarded. An LMF may be sent on a periodic basis and/or in response to predetermined conditions, for example, after every 10 MB of payload has been transmitted by data frames.

FIG. 5 illustrates an example of an LMF format according to some implementations of the invention. LMF 500 begins with standard 6 B Ethernet fields 510 and 520 for the frame's destination address and source address, respectively. Protocol type header 530 indicates that DCE header 540 follows, which is a short DCE header in this example (e.g., Long Header field=0). The VL, TTL, ECN and frame credit fields of DCE header 540 are set to zero by the sender and ignored by the receiver. Accordingly, an LMF may be identified by the following characteristics: Protocol_Type=DCE_Header and Long_Header=0 and Frame_Credit=0.

Field 550 indicates receiver buffer credits for active VLs. In this example, there are 8 active VLs, so buffer credits are indicated for each active VL by fields 551 through 558. Similarly, field 560 indicates buffer credits for the sending device, so frame credits are indicated for each active VL by fields 561 through 568.

LMF 500 does not contain any payload. If necessary, as in this example, LMF 500 is padded by pad field 570 to 64 Bytes in order to create a legal minimum-sized Ethernet frame. LMF 500 terminates with a standard Ethernet CRC field 580.

In general, the buffer-to-buffer crediting scheme of the present invention is implemented according to the following two rules: (1) a Sender transmits a frame when it has a number of credits from the Receiver greater or equal to the number of credits required for the frame to be sent; and (2) a Receiver sends credits to the Sender when it can accept additional frames. As noted above, credits can be replenished using either data frames or LMFs. A port is allowed to transmit a frame for a specific VL only if there are at least as many credits as the frame length (excluding the length of the DCE header).

Similar rules apply if a Pause Frame is used instead of credits. A Sender transmits a frame when it has not been paused by the Receiver. A Receiver sends a PAUSE frame to the Sender when it cannot accept additional frames.

Figure 6A:
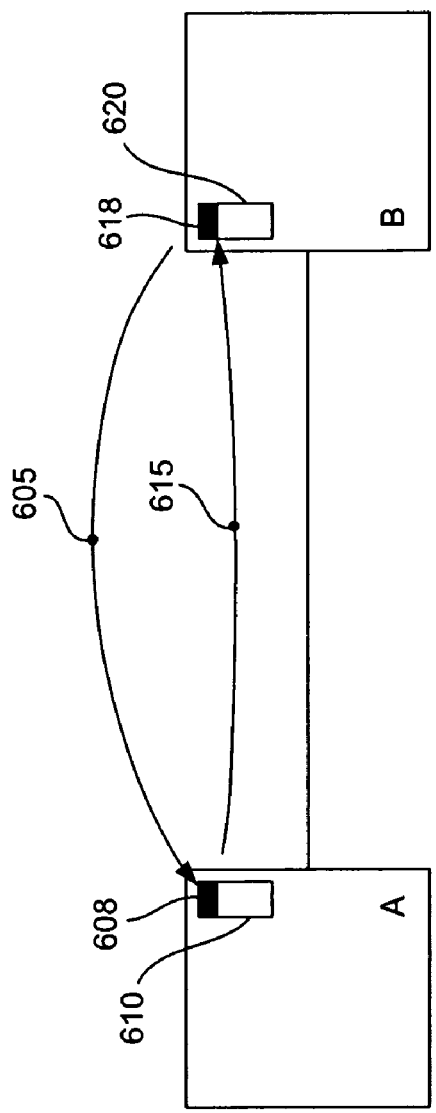
FIG. 6A is a network diagram that illustrates a simplified credit-based method of the present invention.

Following is a simplified example of data transfer and credit replenishment. FIG. 6A illustrates data frame 605, having a short DCE header, which is sent from switch B to switch A. After packet 605 arrives at switch A, it will be kept in memory space 608 of buffer 610. Because some amount of the memory of buffer 610 is consumed, there will be a corresponding decrease in the available credits for switch B. Similarly, when data frame 615 (also having a short DCE header) is sent from switch A to switch B, data frame 615 will consume memory space 618 of buffer 620 and there will be a corresponding reduction in the credits available to switch A.

However, after frames 605 and 615 have been forwarded, corresponding memory spaces will be available in the buffers of the sending switches. At some point, e.g., periodically or on demand, the fact that this buffer space is once again available should be communicated to the device at the other end of the link. Data frames having a long DCE header and LMFs are used to replenish credits. If no credits are being replenished, the short DCE header may be used. Although some implementations use the longer DCE header for all transmissions, such implementations are less efficient because, e.g., extra bandwidth is being consumed for packets that contain no information regarding the replenishment of credits.

Figure 6B:
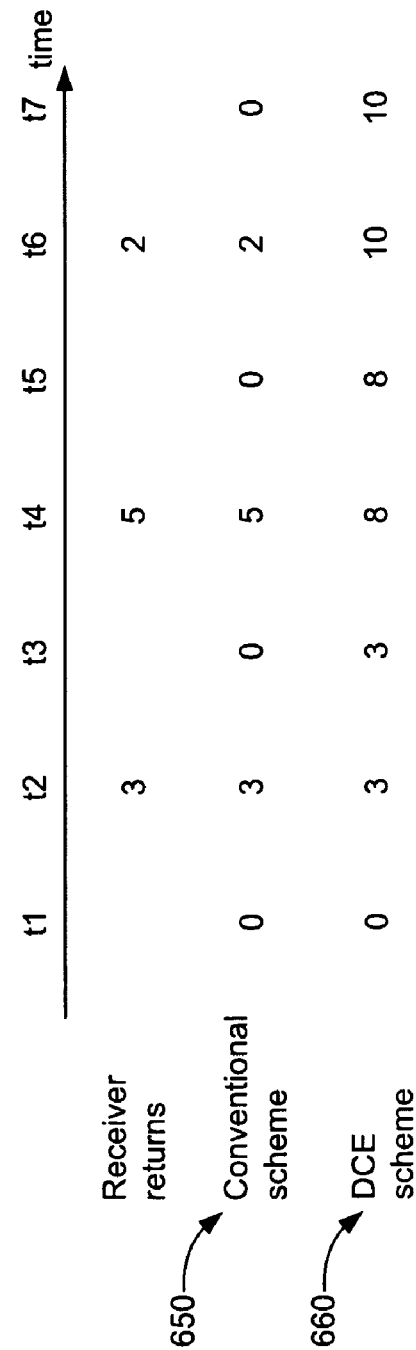
FIG. 6B is a table that depicts a crediting method of the present invention.

FIG. 6B illustrates one example of a credit signaling method of the present invention. Conventional credit signaling scheme 650 advertises the new credits that the receiver wants to return. For example, at time t4 the receiver wants to return 5 credits and therefore the value 5 is carried in the frame. At time t5 the receiver has no credit to return and therefore the value 0 is carried in the frame. If the frame at time t4 is lost, five credits are lost.

DCE scheme 660 advertises the cumulative credit value. In other words, each advertisement sums the new credit to be returned to the total number of credits previously returned modulo m (with 8 bits, m is 256). For example, at time t3 the total number of credits returned since link initialization is 3; at time t4, since 5 credits need to be returned, 5 is summed to 3 and 8 is sent in the frame. At time t5 no credits need to be returned and 8 is sent again. If the frame at time t4 is lost, no credits are lost, because the frame at time t5 contains the same information.

According to one exemplary implementation of the invention, a receiving DCE switch port maintains the following information (wherein VL indicates that the information is maintained per virtual lane):
BufCrd[VL]—a modulus counter which is incremented by the number of credits which could be sent;
BytesFromLastLongDCE—the number of bytes sent since the last Long DCE header;
BytesFromLastLMF—the number of bytes sent since the last LMF;
MaxIntBetLongDCE—the maximum interval between sending Long DCE header;
MaxIntBetLMF—the maximum interval between sending LMF; and
FrameRx—a modulus counter which is incremented by the FrameCredit field of the received frame.

A sending DCE switch port maintains the following information:
LastBufCrd[VL]—The last estimated value of the BufCrd [VL] variable of the receiver; and
FrameCrd[VL]—a modulus counter which is incremented by the number of credits used to transmit a frame.

When links come up, the network devices on each end of a link will negotiate the presence of a DCE header. If the header is not present, the network devices will, for example, simply enable the link for standard Ethernet. If the header is present, the network devices will enable features of a DCE link according to some aspect of the invention.

Figure 6C:
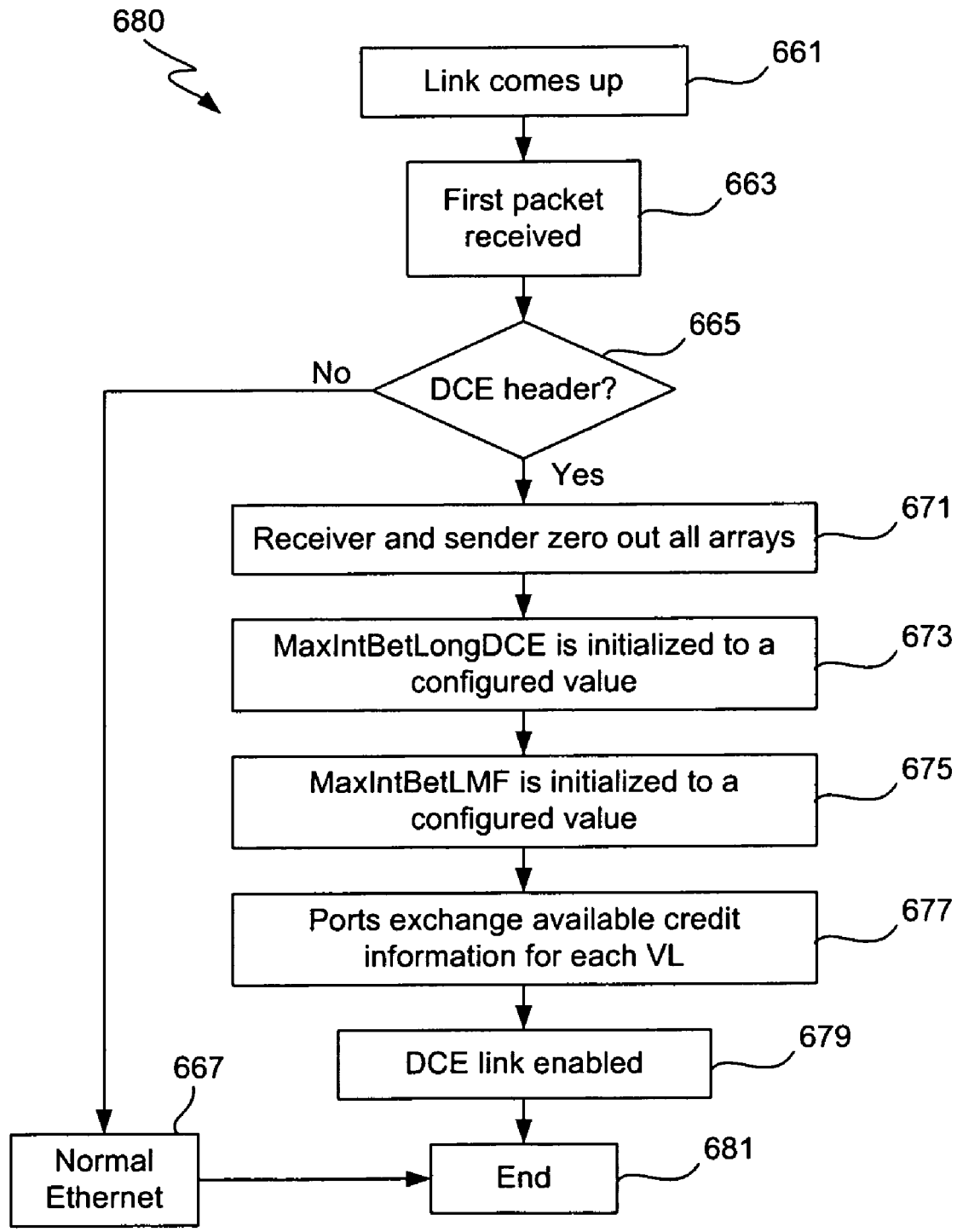
FIG. 6C is a flow chart that outlines one exemplary method for initializing a link according to the present invention.

FIG. 6C is a flow chart that indicates how a DCE link is initialized according to some implementations of the invention. One of skill in the art will appreciate that the steps of method 680 (like other methods described herein) need not be, and in some cases are not, performed in the order indicated. Moreover, some implementations of these methods include more or fewer steps than are indicated.

In step 661, the physical link comes up between two switch ports and in step 663 a first packet is received. In step 665, it is determined (by the receiving port) whether the packet has a DCE header. If not, the link is enabled for standard Ethernet traffic. If the packet has a DCE header, the ports perform steps to configure the link as a DCE link. In step 671, the receiver and sender zero out all arrays relating to traffic on the link. In step 673, the value of MaxIntBetLongDCE is initialized to a configured value and in step 675, MaxIntBetLMF is initialized to a configured value.

In step 677, the two DCE ports exchange available credit information for each VL, preferably by sending an LMF. If a VL is not used, its available credit is announced as 0. In step 679, the link is enabled for DCE and normal DCE traffic, including data frames, may be sent on the link according to the methods described herein.

To work properly in the presence of a single frame loss, the DCE self-recovering mechanism of preferred implementations requires that the maximum number of credits advertised in a frame be less than ½ of the maximum advertisable value. In some implementations of the short DCE header each credit field is 8 bits, i.e. a value of 256. Thus, up to 127 additional credits can be advertised in a single frame. The maximum value of 127 credits is reasonable, since the worst situation is represented by a long sequence of minimum size frames in one direction and a single jumbo frame in the opposite direction. During the transmission of a 9 KB jumbo frame, the maximum number of minimum size frames is approximately 9220 B/84 B=110 credits (assuming a 9200-byte maximum transmission unit and 20 bytes of IPG and Preamble).

If multiple consecutive frames are lost, an LMF recovery method can "heal" the link. One such LMF recovery method works on the idea that, in some implementations, internal counters maintained by the ports of DCE switches are 16 bits, but to conserve bandwidth, only the lower 8 bits are transmitted in the long DCE header. This works well if there are no consecutive frame losses, as explained before. When the link experiences multiple consecutive errors, the long DCE header may no longer be able to synchronize the counters, but this is achieved through LMFs that contain the full 16 bits of all the counters. The 8 additional bits allow the recovery of 256 times more errors for a total of 512 consecutive errors. Preferably, before this situation is encountered the link is declared inoperative and reset.

In order to implement a low latency Ethernet system, at least 3 general types of traffic must be considered. These types are IP network traffic, storage traffic and cluster traffic. As described in detail above, LLE provides "no drop" VLs with FC-like characteristics that are suitable for, e.g., storage traffic. The "no drop" VL will not lose packets/frames and may be provided according to a simple stack, e.g., as shown in FIG. 8. Only a small "shim" of FC over LLE 810 is between LLE layer 805 and FC Layer 2 (815). Layers 815, 820 and 825 are the same as those of FC stack 750. Therefore, storage applications that were previously running over FC can be run over LLE.

Figure 9:
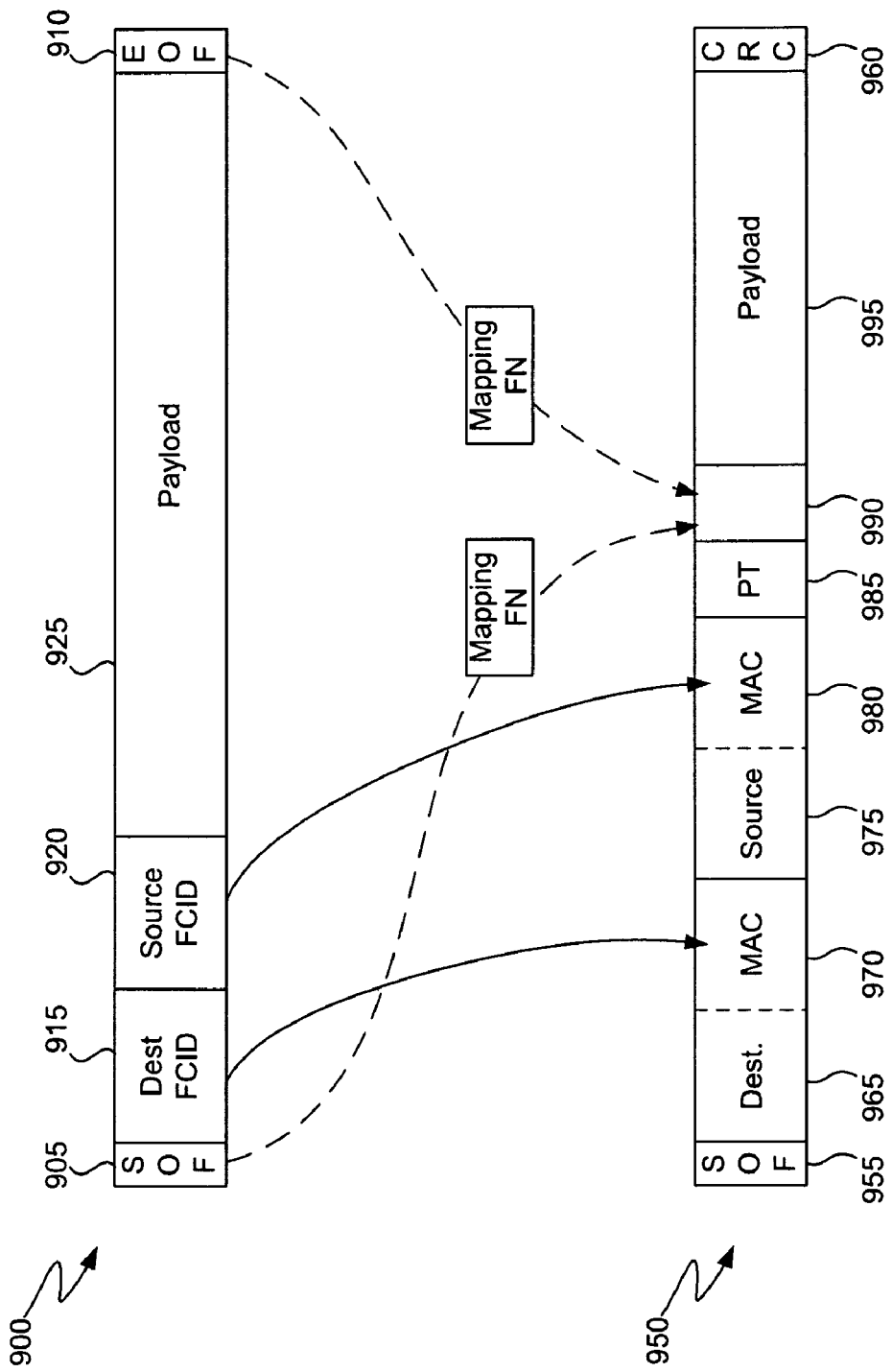
FIGS. 9A and 9B depicts a method for implementing FC over Ethernet according to some aspects of the invention.
Figure 10:
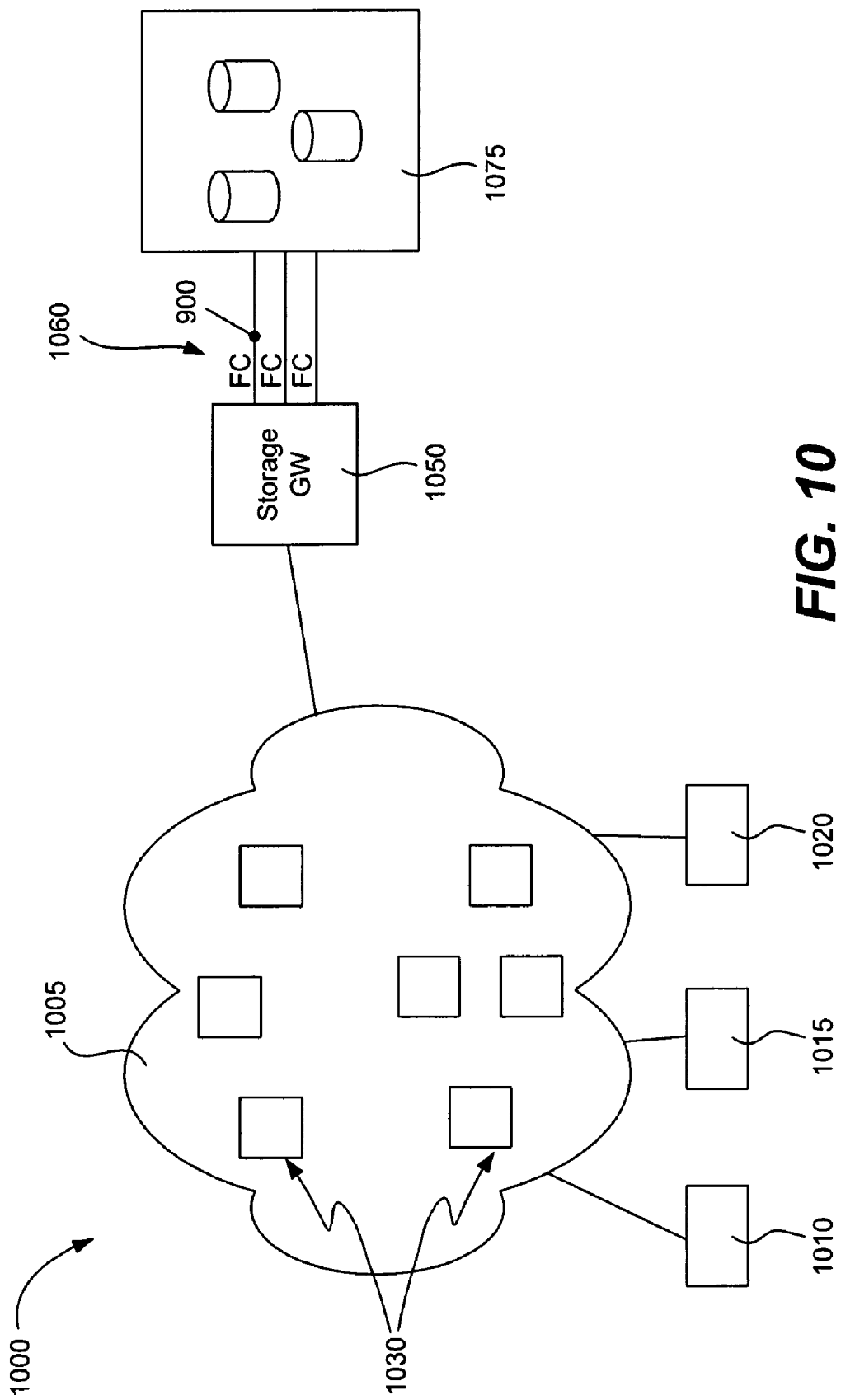
FIG. 10 is a simplified network diagram for implementing FC over Ethernet according to some aspects of the invention.

The mapping of FC frames to FC over Ethernet frames according to one exemplary implementation of FC over LLE layer 810 will now be described with reference to FIGS. 9A, 9B and 10. FIG. 9A is a simplified version of an FC frame. FC frame 900 includes SOF 905 and EOF 910, which are ordered sets of symbols used not only to delimit the boundaries of frame 900, but also to convey information such as the class of the frame, whether the frame is the start or the end of a sequence (a group of FC frames), whether the frame is normal or abnormal, etc. At least some of these symbols are illegal "code violation" symbols. FC frame 900 also includes 24-bit source FC ID field 915, 24-bit destination FC ID field 920 and payload 925.

One goal of the present invention is to convey storage information contained in an FC frames, such as FC frame 900, across an Ethernet. FIG. 10 illustrates one implementation of the invention for an LLE that can convey such storage traffic. Network 1000 includes LLE cloud 1005, to which devices 1010, 1015 and 1020 are attached. LLE cloud 1005 includes a plurality of LLE switches 1030, exemplary architecture for which is discussed elsewhere herein. Devices 1010, 1015 and 1020 may be host devices, servers, switches, etc. Storage gateway 1050 connects LLE cloud 1005 with storage devices 1075. For the purposes of moving storage traffic, network 1000 may be configured to function as an FC network. Accordingly, the ports of devices 1010, 1015 and 1020 each have their own FC ID and ports of storage devices 1075 have FC IDs.

In order to move efficiently the storage traffic, including frame 900, between devices 1010, 1015 and 1020 and storage devices 1075, some preferred implementations of the invention map information from fields of FC frame 900 to corresponding fields of LLE packet 950. LLE packet 950 includes SOF 955, organization ID field 965 and device ID field 970 of destination MAC field, organization ID field 975 and device ID field 980 of source MAC field, protocol type field 985, field 990 and payload 995.

Preferably, fields 965, 970, 975 and 980 are all 24-bit fields, in conformance with normal Ethernet protocol. Accordingly, in some implementations of the invention, the contents of destination FC ID field 915 of FC frame 900 are mapped to one of fields 965 or 970, preferably to field 970. Similarly, the contents of source FC ID field 920 of FC frame 900 are mapped to one of fields 975 or 980, preferably to field 980. It is preferable to map the contents of destination FC ID field 915 and source FC ID field 920 of FC frame 900 to fields 970 and 980, respectively, of LLE packet 950 because, by convention, many device codes are assigned by the IEEE for a single organization code. This mapping function may be performed, for example, by storage gateway 1050.

Therefore, the mapping of FC frames to LLE packets may be accomplished in part by purchasing, from the IEEE, an Organization Unique Identifier ("OUI") codes that correspond to a group of device codes. In one such example, the current assignee, Cisco Systems, pays the registration fee for an OUI, assigns the OUI to "FC over Ethernet." A storage gateway configured according to this aspect of the present invention (e.g., storage gateway 1050) puts the OUI in fields 965 and 975, copies the 24-bit contents of destination FC ID field 915 to 24-bit field 970 and copies the 24-bit contents of source FC ID field 920 to 24-bit field 980. The storage gateway inserts a code in protocol type field 985 that indicates FC over Ethernet and copies the contents of payload 925 to payload field 995.

Because of the aforementioned mapping, no MAC addresses need to be explicitly assigned on the storage network. Nonetheless, as a result of the mapping, an algorithmically derived version of the destination and source FC IDs are encoded in corresponding portions of the LLE frame that would be assigned, in a normal Ethernet packet, to destination and source MAC addresses. Storage traffic may be routed on the LLE network by using the contents of these fields as if they were MAC address fields.

The SOF field 905 and EOF field 910 contain ordered sets of symbols, some of which (e.g., those used to indicate the start and end of an FC frame) are reserved symbols that are sometimes referred to as "illegal" or "code violation" symbols. If one of these symbols were copied to a field within LLE packet 950 (for example, to field 990), the symbol would cause an error, e.g., by indicating that LLE packet 950 should terminate at that symbol. However, the information that is conveyed by these symbols must be retained, because it indicates the class of the FC frame, whether the frame is the start or the end of a sequence and other important information.

Accordingly, preferred implementations of the invention provide another mapping function that converts illegal symbols to legal symbols. These legal symbols may then be inserted in an interior portion of LLE packet 950. In one such implementation, the converted symbols are placed in field 990. Field 990 does not need to be very large; in some implementations, it is only 1 or 2 bytes in length.

To allow the implementation of cut-through switching field 990 may be split into two separate fields. For example, one field may be at the beginning of the frame and one may be at the other end of the frame.

The foregoing method is but one example of various techniques for encapsulating an FC frame inside an extended Ethernet frame. Alternative methods include any convenient mapping that involves, for example, the derivation of the tuple {VLAN, DST MAC Addr, Src MAC Addr} from the tuple {VSAN, D_ID, S_ID}.

The aforementioned mapping and symbol conversion processes produce an LLE packet, such as LLE packet 950, that allows storage traffic to and from FC-based storage devices 1075 to be forwarded across LLE cloud 1005 to end node devices 1010, 1015 and 1020. The mapping and symbol conversion processes can be run, e.g., by storage gateway 1050, on a frame-by-frame basis.

Accordingly, the present invention provides exemplary methods for encapsulating an FC frame inside an extended Ethernet frame at the ingress edge of an FC-Ethernet cloud. Analogous method of the invention provide for an inverse process that is performed at the egress edge of the Ethernet-FC cloud. An FC frame may be decapsulated from an extended Ethernet frame and then transmitted on an FC network.

Some such methods include these steps: receiving an Ethernet frame (encapsulated, for example, as described herein); mapping destination contents of a first portion of a destination MAC field of the Ethernet frame to a destination FC ID field of an FC frame; mapping source contents of a second portion of a source MAC field of the Ethernet frame of a source FC ID field of the FC frame; converting legal symbols of the Ethernet frame to illegal symbols; inserting the illegal symbols into selected fields of the FC frame; mapping payload contents of a payload field of the Ethernet frame to an FC frame payload field; and transmitting the FC frame on the FC network.

No state information about the frames needs to be retained. Accordingly, the frames can be processed quickly, for example at a rate of 40 Gb/s. The end nodes can run storage applications based on SCSI, because the storage applications see the SCSI layer 825 of LLE stack 800, depicted in FIG. 8. Instead of forwarding storage traffic across switches dedicated to FC traffic, such as FC switches 140 and 145 shown in FIG. 1, such FC switches can be replaced by LLE switches 1030.

Figure 11:
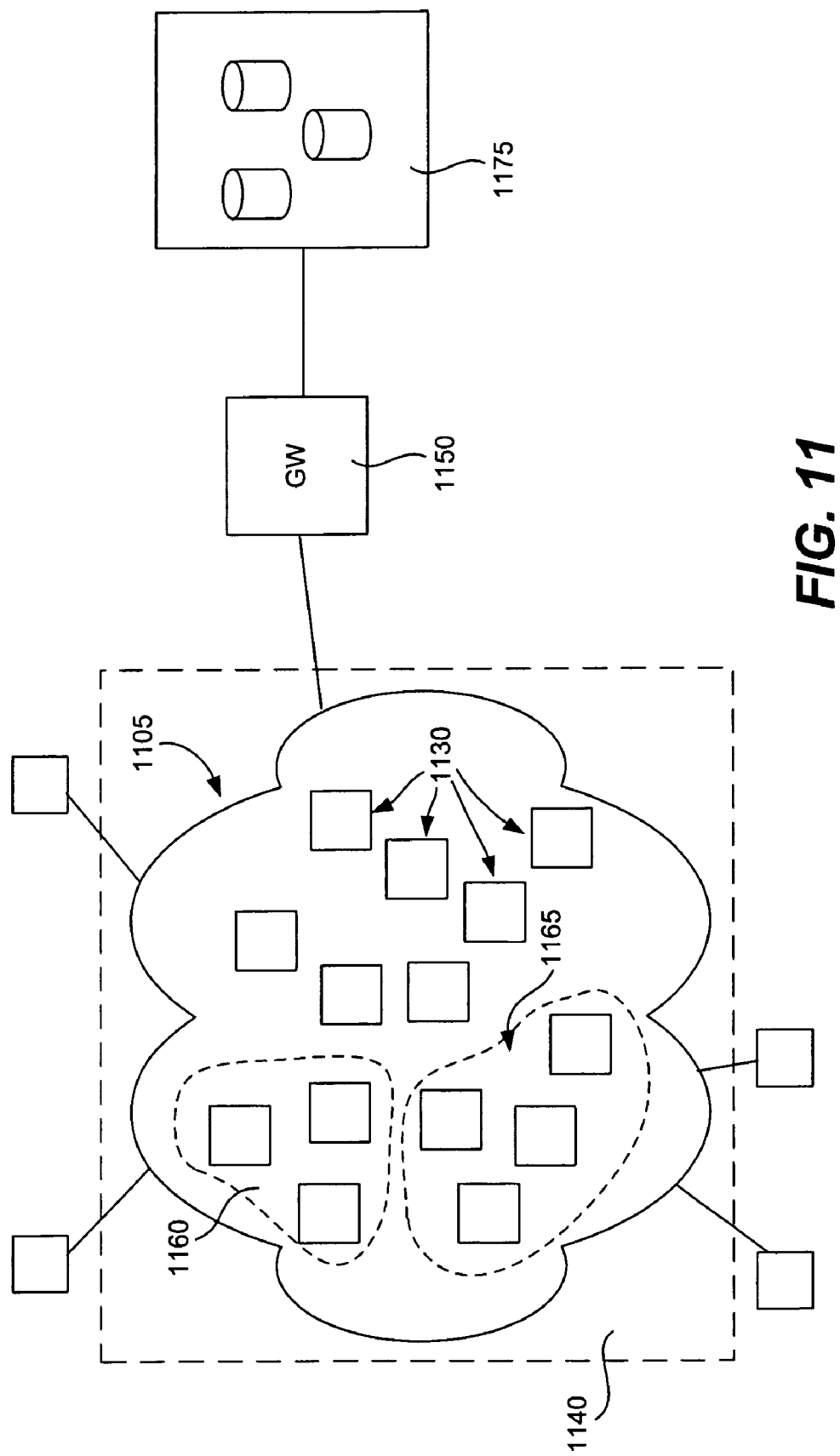
FIG. 11 is a simplified network diagram for aggregating DCE switches according to some aspects of the invention.

Moreover, the functionality of LLE switches allows for an unprecedented level of management flexibility. Referring to FIG. 11, in one management scheme, each of the LLE switches 1130 of LLE cloud 1105 may be treated as separate FC switches. Alternatively, some or all of the LLE switches 1130 may be aggregated and treated, for management purposes, as FC switches. For example, virtual FC switch 1140 has been formed, for network management purposes, by treating all LLE switches in LLE cloud 1105 as a single FC switch. All of the ports of the individual LLE switches 1130, for example, would be treated as ports of virtual FC switch 1140. Alternatively, smaller numbers of LLE switches 1130 could be aggregated. For example, 3 LLE switches have been aggregated to form virtual FC switch 1160 and 4 LLE switches have been aggregated to form virtual FC switch 1165. A network manager may decide how many switches to aggregate by considering, inter alia, how many ports the individual LLE switches have. The control plane functions of FC, such as zoning, DNS, FSPF and other functions may be implemented by treating each LLE switch as an FC switch or by aggregating multiple LLE switches as one virtual FC switch.

Also, the same LLE cloud 1105 may support numerous virtual networks. Virtual local area networks ("VLANs") are known in the art for providing virtual Ethernet-based networks. U.S. Pat. No. 5,742,604, entitled "Interswitch Link Mechanism for Connecting High-Performance Network Switches" describes relevant systems and is hereby incorporated by reference. Various patent applications of the present assignee, including U.S. patent application Ser. No. 10/034, 160, entitled "Methods And Apparatus For Encapsulating A Frame For Transmission In A Storage Area Network" and filed on Dec. 26, 2001, provide methods and devices for implementing virtual storage area networks ("VSANs") for FC-based networks. This application is hereby incorporated by reference in its entirety. Because LLE networks can support both Ethernet traffic and FC traffic, some implementations of the invention provide for the formation of virtual networks on the same physical LLE cloud for both FC and Ethernet traffic.

Figure 12:
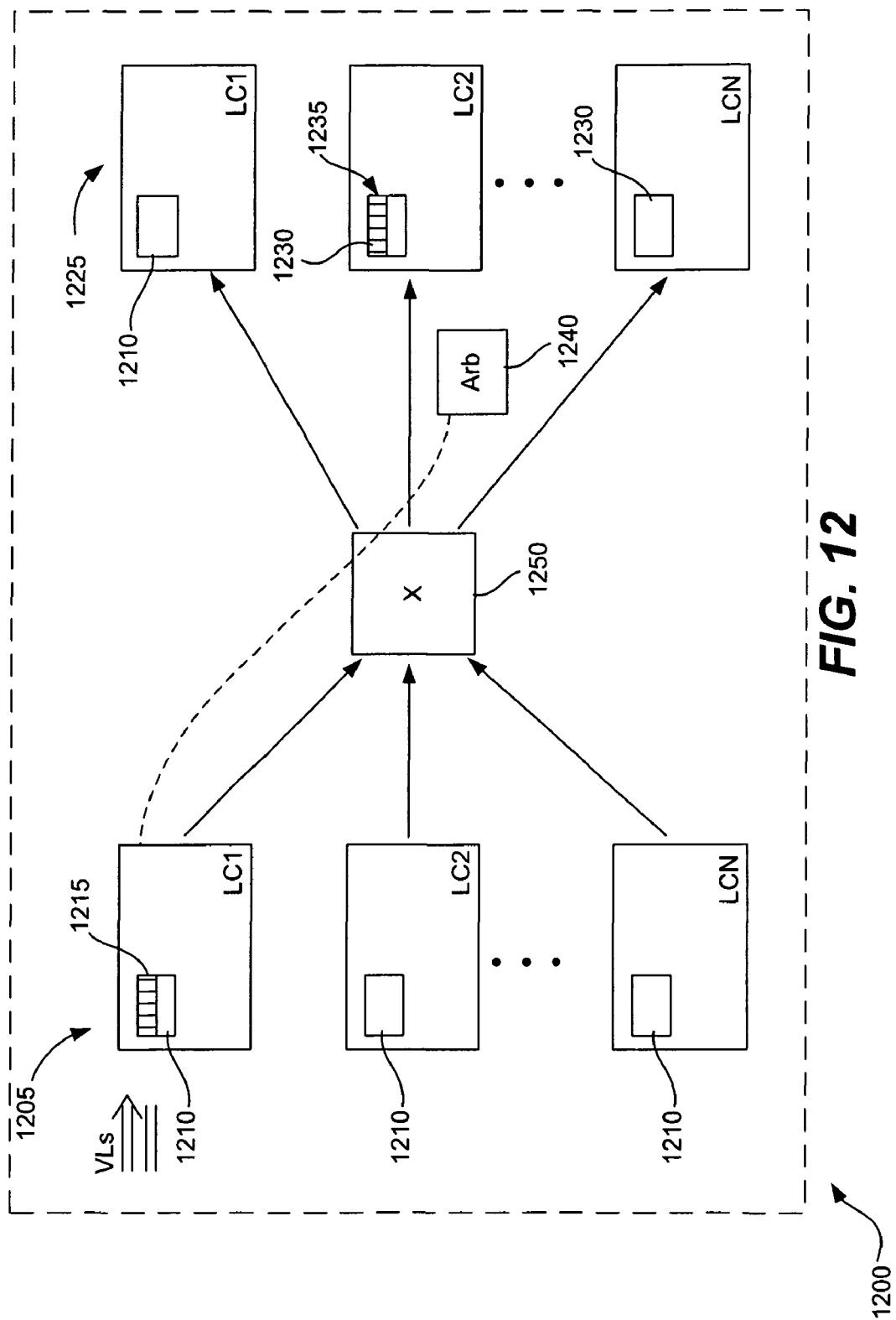
FIG. 12 depicts the architecture of a DCE switch according to some embodiments of the invention.

FIG. 12 is a schematic diagram that illustrates a simplified architecture of DCE switch 1200 according to one embodiment of the invention. DCE switch 1200 includes N line cards, each of which characterized by and ingress side (or input) 1205 and an egress side (or output) 1225. Line card ingress sides 1205 are connected via switching fabric 1250, which includes a crossbar in this example, to line card egress sides 1225.

In this implementation, buffering is performed on both the input and output sides. Other architectures are possible, e.g., those having input buffers, output buffers and shared memory. Accordingly, each of input line cards 1205 includes at least one buffer 1210 and each of output line cards 1225 includes at least one buffer 1230, which may be any convenient type of buffer known in the art, e.g., an external DRAM-based buffer or an on-chip SRAM-based buffer. The buffers 1210 are used for input buffering, e.g., to temporarily retain packets while awaiting sufficient buffer to become available at the output linecard to store the packets to be sent across switching fabric 1250. Buffers 1230 are used for output buffering, e.g., to temporarily retain packets received from one or more of the input line cards 1205 while awaiting sufficient credits for the packets to be transmitted to another DCE switch.

It is worthwhile noting that while credits may be used internally to a switch and also externally, there is not necessarily a one-to-one mapping between internal and external credits. Moreover, it is possible to use PAUSE frame either internally or externally. For example, any of the four possible combinations PAUSE-PAUSE, PAUSE-CREDITS, CREDITs-PAUSE and CREDIT-CREDIT may produce viable solutions.

DCE switch 1200 includes some form of credit mechanism for exerting flow control. This flow control mechanism can exert back pressure on buffers 1210 when an output queue of one of buffers 1230 has reached its maximum capacity. For example, prior to sending a frame, one of the input line cards 1205 may request a credit from arbiter 1240 (which may be, e.g., a separate chip located at a central location or a set of chips distributed across the output linecards) prior to sending a frame from input queue 1215 to output queue 1235. Preferably, the request indicates the size of the frame, e.g., according to the frame credit field of the DCE header. Arbiter 1240 will determine whether output queue 1235 can accept the frame (i.e., output buffer 1230 has enough space to accommodate the frame). If so, the credit request will be granted and arbiter 1240 will send a credit grant to input queue 1215. However, if output queue 1235 is too full, the request will be denied and no credits will be sent to input queue 1215.

DCE switch 1200 needs to be able to support both the "drop" and "no drop" behavior required for virtual lanes, as discussed elsewhere herein. The "no drop" functionality is enabled, in part, by applying internally to the DCE switch some type of credit mechanism like the one described above. Externally, the "no drop" functionality can be implemented in accordance with the buffer-to-buffer credit mechanism described earlier or PAUSE frames. For example, if one of input line cards 1205 is experiencing back pressure from one or more output line cards 1225 through the internal credit mechanism, the line card can propagate that back pressure externally in an upstream direction via a buffer-to-buffer credit system like that of FC.

Preferably, the same chip (e.g., the same ASIC) that is providing "no drop" functionality will also provide "drop" functionality like that of a classical Ethernet switch. Although these tasks could be apportioned between different chips, providing both drop and no drop functionality on the same chip allows DCE switches to be provided at a substantially lower price.

Each DCE packet will contain information, e.g., in the DCE header as described elsewhere herein, indicating the virtual lane to which the DCE packet belongs. DCE switch 1200 will handle each DCE packet according to whether the VL to which the DCE packet is assigned is a drop or a no drop VL.

FIG. 13 illustrates an example of partitioning a buffer for VLs. In this example, 4 VLs are assigned. VL 1305 and VL 1310 are drop VLs. VL 1315 and VL 1320 are no drop VLs. In this example, input buffer 1300 has specific areas assigned for each VL: VL 1305 is assigned to buffer space 1325, VL 1310 is assigned to buffer space 1330, VL 1315 is assigned to buffer space 1335 and VL 1320 is assigned to buffer space 1340. Traffic on VL 1305 and VL 1310 is managed much like normal Ethernet traffic, in part according to the operations of buffer spaces 1325 and 1330. Similarly, the no drop feature of VLs 1315 and 1320 is implemented, in part, according to a buffer-to-buffer credit flow control scheme that is enabled only for buffer spaces 1335 and 1340.

In some implementations, the amount of buffer space assigned to a VL can be dynamically assigned according to criteria such as, e.g., buffer occupancy, time of day, traffic loads/congestion, guaranteed minimum bandwidth allocation, known tasks requiring greater bandwidth, maximum bandwidth allocation, etc. Preferably, principles of fairness will apply to prevent one VL from obtaining an inordinate amount of buffer space.

Within each buffer space there is an organization of data in data structures which are logical queues (virtual output queues or "VOQs") associated with destinations. ("A Practical Scheduling Algorithm to Achieve 100% Throughput in Input-Queued Switches," by Adisak Mekkittikul and Nick McKeown, Computer Systems Laboratory, Stanford University (InfoCom 1998) and the references cited therein describe relevant methods for implementing VOQs and are hereby incorporated by reference.) The destinations are preferably destination port/virtual lane pairs. Using a VOQ scheme avoids head of line blocking at the input linecard caused when an output port is blocked and/or when another virtual lane of the destination output port is blocked.

In some implementations, VOQs are not shared between VLs. In other implementations, a VOQ can be shared between drop VLs or no-drop VLs. However, a VOQ should not be shared between no drop VLs and drop VLS.

The buffers of DCE switches can implement various types of active queue management. Some preferred embodiments of DCE switch buffers provide at least 4 basic types of active queue management: flow control; dropping for drop VLs or marking for no-drop VLs for congestion avoidance purposes; dropping to avoid deadlocks in no drop VLs; and dropping for latency control.

Preferably, flow control for a DCE network has at least two basic manifestations. One flow control manifestation is a buffer-to-buffer, credit-based flow control that is used primarily to implement the "no drop" VLs. Another flow control manifestation of some preferred implementations involves an explicit upstream congestion notification. This explicit upstream congestion notification may be implemented, for example, by the explicit congestion notification ("ECN") field of the DCE header, as described elsewhere herein.

Figure 14:
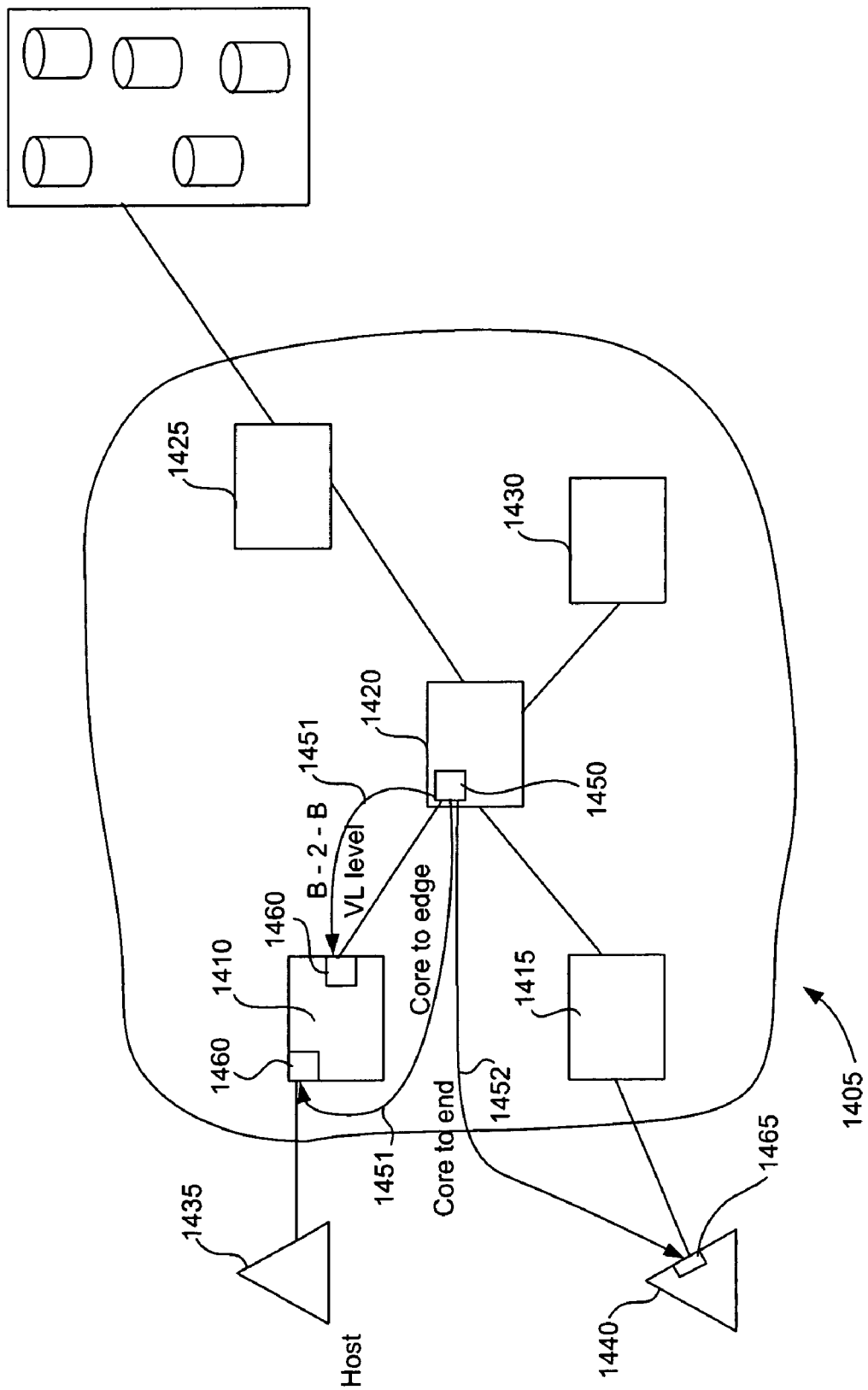
FIG. 14 is a network diagram that illustrates some types of explicit congestion notification according to the present invention.

FIG. 14 illustrates DCE network 1405, including edge DCE switches 1410, 1415, 1425 and 1430 and core DCE switch 1420. In this instance, buffer 1450 of core DCE switch 1420 is implementing 3 types of flow control. One is buffer-to-buffer flow control indication 1451, which is communicated by the granting (or not) of buffer-to-buffer credits between buffer 1450 and buffer 1460 of edge DCE switch 1410.

Buffer 1450 is also transmitting 2 ECNs 1451 and 1452, both of which are accomplished via the ECN field of the DCE headers of DCE packets. ECN 1451 would be considered a core-to-edge notification, because it is sent by core device 1420 and received by buffer 1460 of edge DCE switch 1410. ECN 1452 would be considered a core-to-end notification, because it is sent by core device 1420 and received by NIC card 1465 of end-node 1440.

In some implementations of the invention, ECNs are generated by sampling a packet that is stored into a buffer subject to congestion. The ECN is sent to the source of that packet by setting its destination address equal to the source address of the sampled packet. The edge device will know whether the source supports DCE ECN, as end-node 1440 does, or it doesn't, as in the case of end-node 1435. In the latter case, edge device 1410 will terminate the ECN and implement the appropriate action.

Active queue management (AQM) will be performed in response to various criteria, including but not limited to buffer occupancy (e.g., per VL), queue length per VOQ and the age of a packet in a VOQ. For the sake of simplicity, in this discussion of AQM it will generally be assumed that a VOQ is not shared between VLs.

Figure 15:
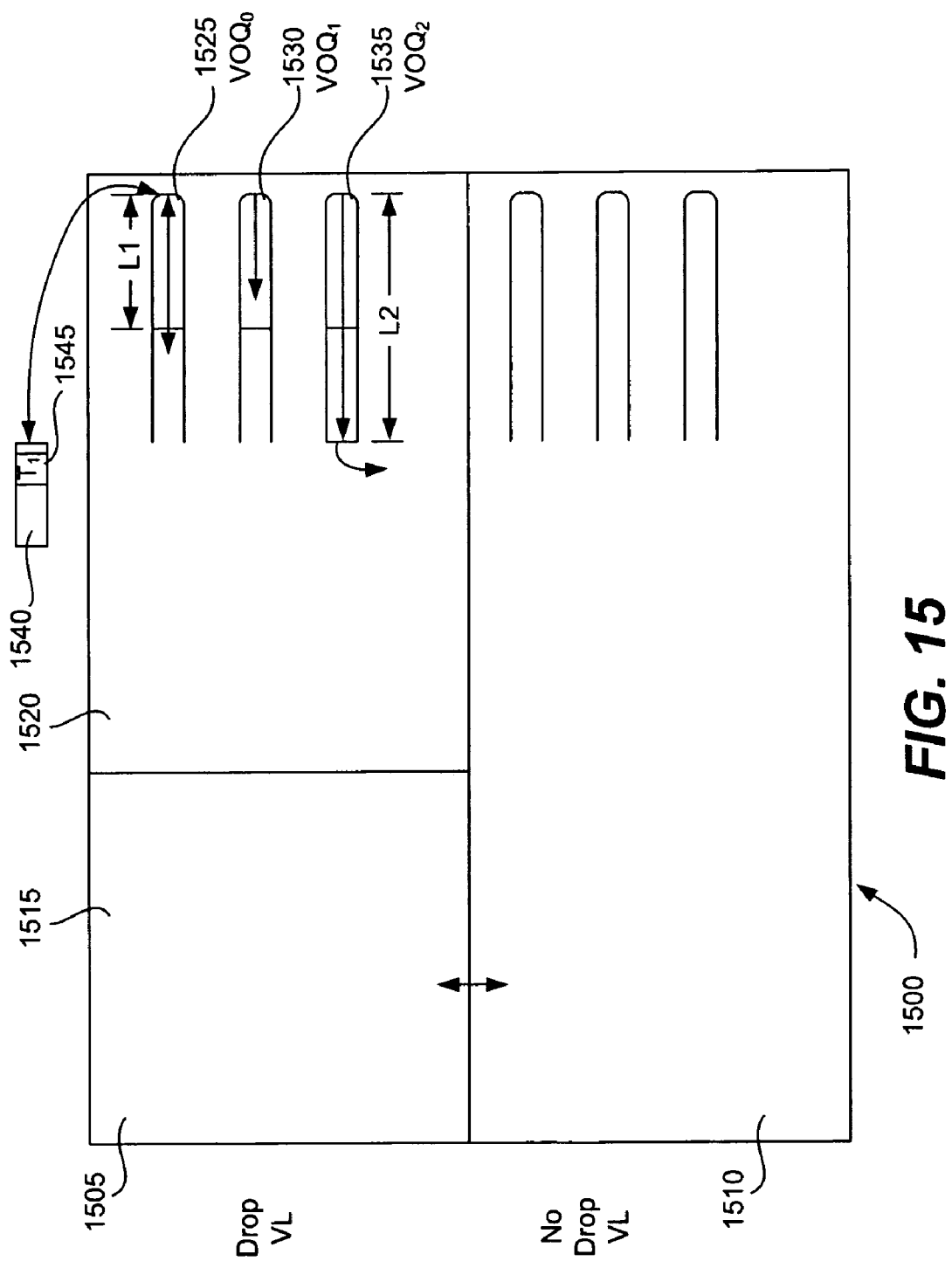
FIG. 15 is a block diagram that illustrates buffer management per VL according to some implementations of the invention.

Some examples of AQM according to the present invention will now be described with reference to FIG. 15. FIG. 15 depicts buffer usage at a particular time. At that time, portion 1505 of physical buffer 1500 has been allocated to a drop VL and portion 1510 has been allocated to a no drop VL. As noted elsewhere herein, the amount of buffer 1500 that is allocated to drop VLs or no drop VLs can change over time. Of the portion 1505 allocated to a drop VL, part 1520 is currently in use and part 1515 is not currently in use.

Within portions 1505 and 1510, there numerous VOQs, including VOQs 1525, 1530 and 1535. In this example, a threshold VOQ length L has been established. VOQs 1525 and 1535 have a length greater than L and, VOQ 1530 has a length less than L. A long VOQ indicates downstream congestion. Active queue management preferably prevents any VOQ from becoming too large, because otherwise downstream congestion affecting one VOQ will adversely affect traffic for other destinations.

The age of a packet in a VOQ is another criterion used for AQM. In preferred implementations, a packet is time stamped when it comes into a buffer and queued into the proper VOQ. Accordingly, packet 1540 receives time stamp 1545 upon its arrival in buffer 1500 and is placed in a VOQ according to its destination and VL designation. As noted elsewhere, the VL designation will indicate whether to apply drop or no drop behavior. In this example, the header of packet 1540 indicates that packet 1540 is being transmitted on a drop VL and has a destination corresponding to that of VOQ 1525, so packet 1540 is placed in VOQ 1525.

By comparing the time of time stamp 1545 with a current time, the age of packet 1540 may be determined at subsequent times. In this context, "age" refers only to the time that the packet has spent in the switch, not the time in some other part of the network. Nonetheless, conditions of other parts of the network may be inferred by the age of a packet. For example, if the age of a packet becomes relatively large, this condition indicates that the path towards the destination of the packet is subject to congestion.

In preferred implementations, a packet having an age that exceeds a predetermined age will be dropped. Multiple drops are possible, if at the time of age determination it is found that a number of packets in a VOQ exceed a predetermined age threshold.

In some preferred implementations, there are separate age limits for latency control ($T_L$) and for avoiding deadlocks ($T_D$). The actions to be taken when a packet reaches $T_L$ preferably depend on whether the packet is being transmitted on a drop or a no drop VL. For traffic on a no drop lane, data integrity is more important than latency. Therefore, in some implementations of the invention, when the age of a packet in a no drop VL exceeds $T_L$, the packet is not dropped but another action may be taken. For example, in some such implementations, the packet may be marked and/or an upstream congestion notification may be triggered. For packets in a drop VL, latency control is relatively more important and therefore more aggressive action is appropriate when the age of a packet exceeds $T_L$. For example, a probabilistic drop function may be applied to the packet.

Figure 16:
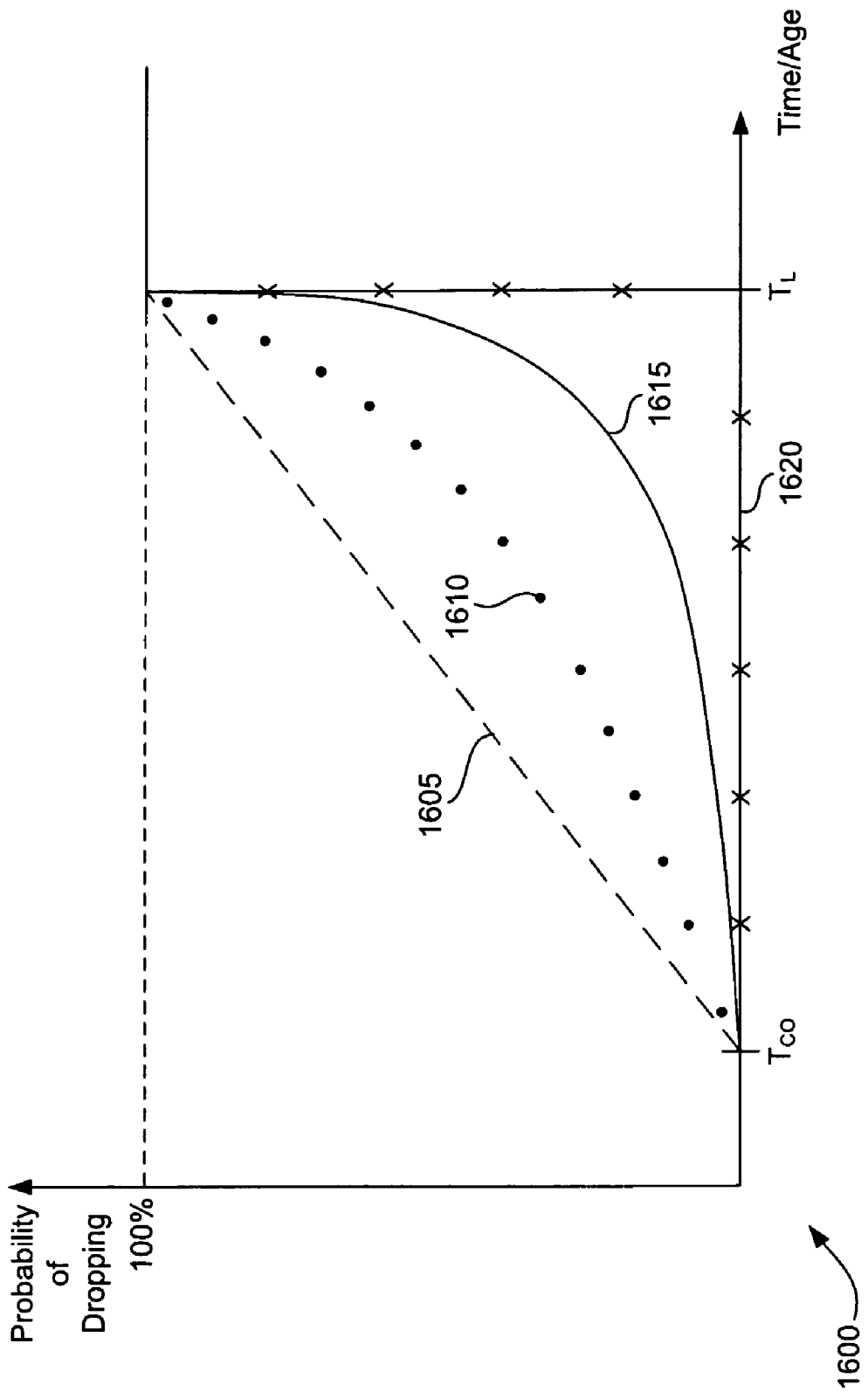
FIG. 16 is a graph that illustrates probabilistic drop functions according to some aspects of the invention.

Graph 1600 of FIG. 16 provides some examples of probabilistic drop functions. According to drop functions 1605, 1610 and 1615, when the age of a packet exceeds $T_{CO}$, i.e., the latency cut-off threshold, the probability that the packet will intentionally be dropped increases from 0% to 100% as its age increases up to $T_L$, depending on the function. Drop function 1620 is a step function, having a 0% probability of intentional dropping until $T_L$ is reached. All of drop functions 1605, 1610, 1615 and 1620 reach a 100% chance of intentional drop when the age of the packet reaches $T_L$. Although $T_{CO}$, $T_L$, and $T_D$ may be any convenient times, in some implementations of the invention $T_{CO}$ is in the order of tens of microseconds, $T_L$ is on the order of ones to tens of milliseconds and $T_D$ is on the order of hundreds of milliseconds, e.g., 500 milliseconds.

If the age of the packet in a drop or a no drop VL exceeds $T_D$, the packet will be dropped. In preferred implementations, $T_D$ is larger for no drop VLs than for drop VLs. In some implementations, $T_L$ and/or $T_D$ may also depend, in part, on the bandwidth of the VL on which the packet is being transmitted and on the number of VOQs simultaneously transmitting packets to that VL.

For no drop VL, a probability function similar to those shown in FIG. 16 may be used to trigger an upstream congestion notification or to set the Congestion Experienced bit (CE) in the header of TCP packets belonging to connections capable to support TCP ECN.

In some implementations, whether a packet is dropped, an upstream congestion notification is sent, or the CE bit of a TCP packet is marked depends not only on the age of a packet but also on the length of the VOQ in which the packet is placed. If such length is above a threshold $L_{max}$, the AQM action is taken; otherwise it will be performed on first packet dequeued from a VOQ whose length exceeds the $L_{max}$ threshold.

Use of Buffer Occupancy Per VL

As shown in FIG. 15, a buffer is apportioned to VLs. For parts of the buffer apportioned to drop VLs (such as portion 1505 of buffer 1500), a packet will be dropped if the occupancy of a VL, at any given time, is greater than a predetermined maximum value. In some implementations, an average occupancy of a VL is computed and maintained. An AQM action may be taken based on such average occupancy. For example, being portion 1505 associated with a no-drop VL, DCE ECNs will be triggered instead of packet drops as in the case of portion 1510, which is associated with a drop VL.

Figure 17:
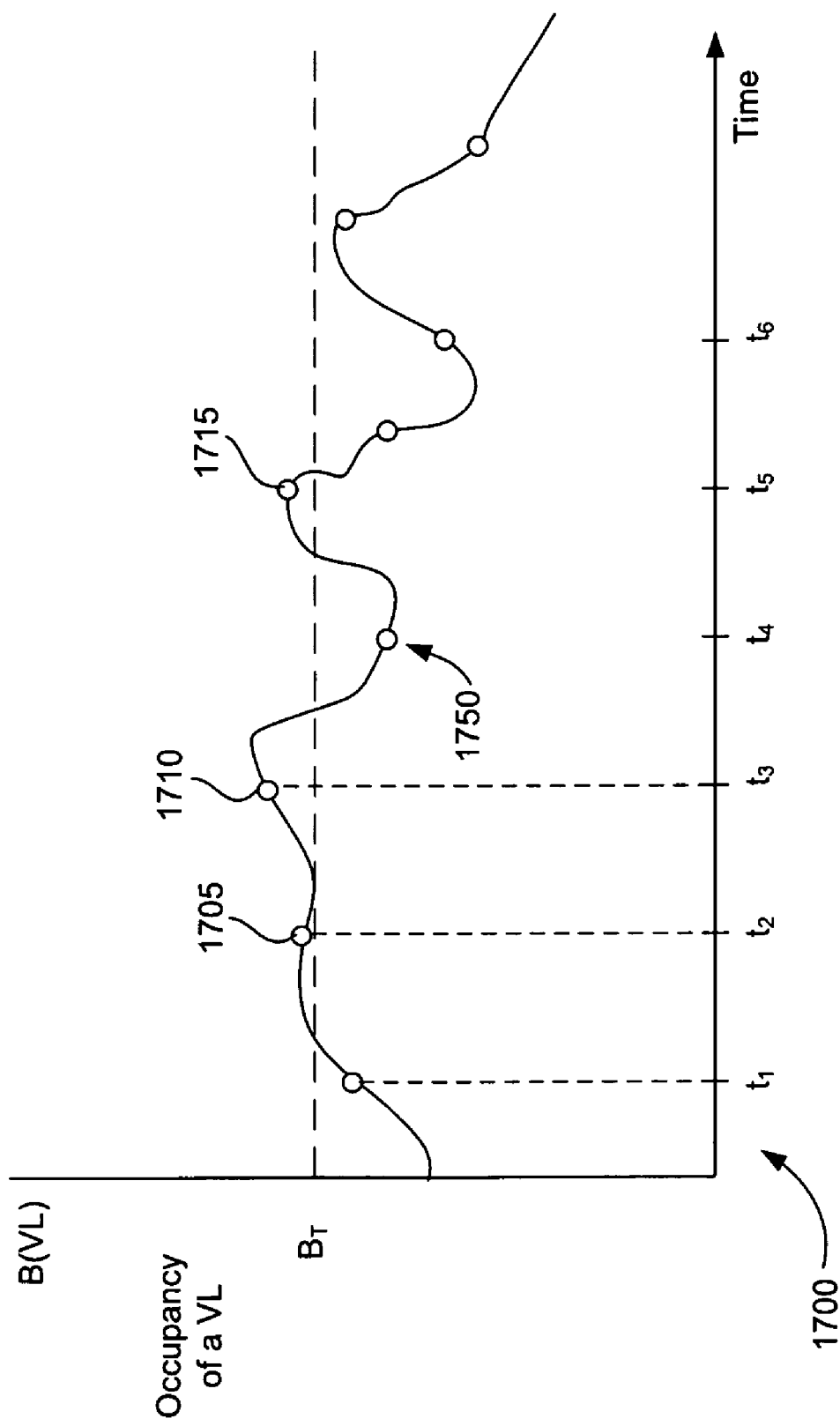
FIG. 17 is a graph that illustrates an exemplary occupancy of a VL buffer over time.

FIG. 17 depicts graph 1700 of VL occupancy B(VL) (the vertical axis) over time (the horizontal axis). Here, $B_T$ is a threshold value of B(VL). In some implementations of the invention, some packets in a VL will be dropped at times during which it is determined that B(VL) has reached. The actual value of B(VL) over time is shown by curve 1750, but B(VL) is only determined at times $t_1$ through $t_N$. In this example, packets would be dropped at points 1705, 1710 and 1715, which correspond to times $t_2$, $t_3$ and $t_6$. The packets may be dropped according to their age (e.g., oldest first), their size, the QoS for the virtual network of the packets, randomly, according to a drop function, or otherwise.

In addition (or alternatively), an active queue management action may be taken when an average value of B(VL), a weighted average value, etc., reaches or exceeds $B_T$. Such averages may be computed according to various methods, e.g., by summing the determined values of B(VL) and dividing by the number of determinations. Some implementations apply a weighting function, e.g., by according more weight to more recent samples. Any type of weighting function known in the art may be applied.

Figure 18:
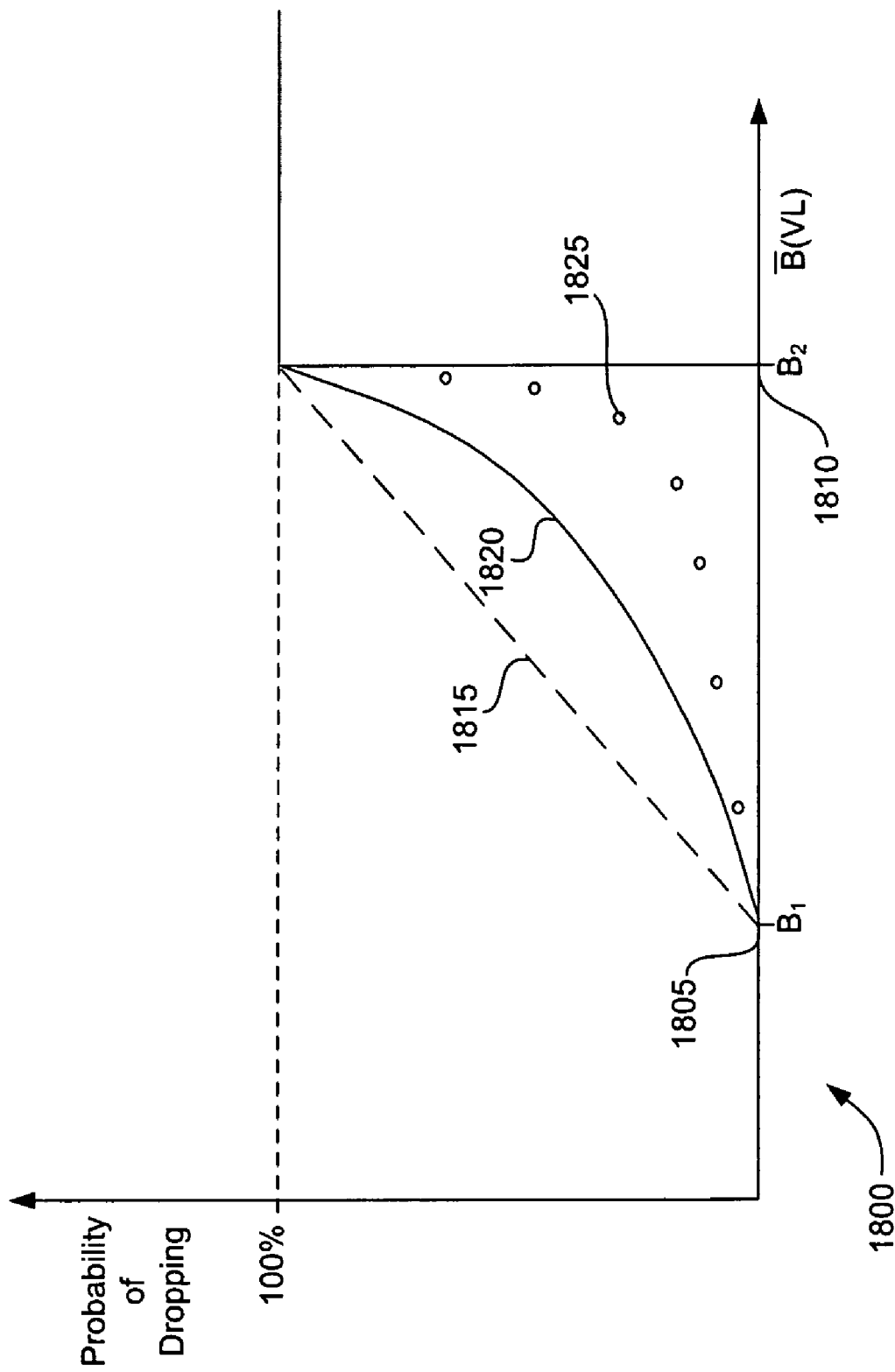
FIG. 18 is a graph that illustrates probabilistic drop functions according to alternative aspects of the invention.

The active queue management action taken may be, for example, sending an ECN and/or applying a probabilistic drop function, e.g., similar to one of those illustrated in FIG. 18. In this example, the horizontal axis of graph 1880 is the average value of B(VL). When the average value is below a first value 1805, there is a 0% chance of intentionally dropping the packet. When the average value reaches or exceeds a second value 1810, there is a 100% chance of intentionally dropping the packet. Any convenient function may be applied to the intervening values, whether a function similar to 1815, 1820 or 1825 or another function.

Returning to FIG. 15, it is apparent that the length of VOQs 1525 and 1535 exceed a predetermined length L. In some implementations of the invention, this condition triggers an active queue management response, e.g., the sending of one or more ECNs. Preferably, packets contained in buffer 1500 will indicate whether the source is capable of responding to an ECN. If the sender of a packet cannot respond to an ECN, this condition may trigger a probabilistic drop function or simply a drop. VOQ 1535 is not only longer than predetermined length $L_1$, it is also longer than predetermined length $L_2$. According to some implementations of the invention, this condition triggers the dropping of a packet. Some implementations of the invention use average VOQ lengths as criteria for triggering active queue management responses, but this is not preferred due to the large amount of computation required.

It is desirable to have multiple criteria for triggering AQM actions. For example, while it is very useful to provide responses to VOQ length, such measures would not be sufficient for DCE switches having approximately 1 to 2 MB of buffer space per port. For a given buffer, there may be thousands of active VOQs. However, there may only be enough storage space for on the order of $10^3$ packets, possibly fewer. Therefore, it may be the case that no individual VOQ has enough packets to trigger any AQM response, but that a VL is running out of space.

Queue Management for No Drop VLs

In preferred implementations of the invention, the main difference between active queue management of drop and no drop VLs is that the same criterion (or criteria) that would trigger a packet drop for a drop VL will result in an DCE ECN being transmitted or a TCP CE bit being marked for no drop VL. For example, a condition that would trigger a probabilistic packet drop for a drop VL would generally result in a probabilistic ECN to an upstream edge device or an end (host) device. Credit-based schemes are not based on where a packet is going, but instead are based on where packets are coming from. Therefore, upstream congestion notifications help to provide fairness of buffer use and to avoid deadlock that might otherwise arise if the sole method of flow control for no drop VLs were a credit-based flow control.

For example, with regard to the use of buffer occupancy per VL as a criterion, packets are preferably not dropped merely because the buffer occupancy per VL has reached or exceeded a threshold value. Instead, for example, a packet would be marked or an ECN would be sent. Similarly, one might still compute some type of average buffer occupancy per VL and apply a probabilistic function, but the underlying action to be taken would be marking and/or sending an ECN. The packet would not be dropped.

However, even for a no drop VL, packets will still be dropped in response to blocking or deadlock conditions, e.g., as indicated by the age of a packet exceeding a threshold as described elsewhere herein. Some implementations of the invention also allow for packets of a no drop VL to be dropped in response to latency conditions. This would depend on the degree of importance placed on latency for that particular no drop VL. Some such implementations apply a probabilistic dropping algorithm. For example, some cluster applications may place a higher value on latency considerations as compared to a storage application. Data integrity is still important to cluster applications, but it may be advantageous to reduce latency by foregoing some degree of data integrity. In some implementations, larger values $T_L$ (i.e., the latency control threshold) may be used for no drop lanes than the corresponding values used for drop lanes.

Figure 19:
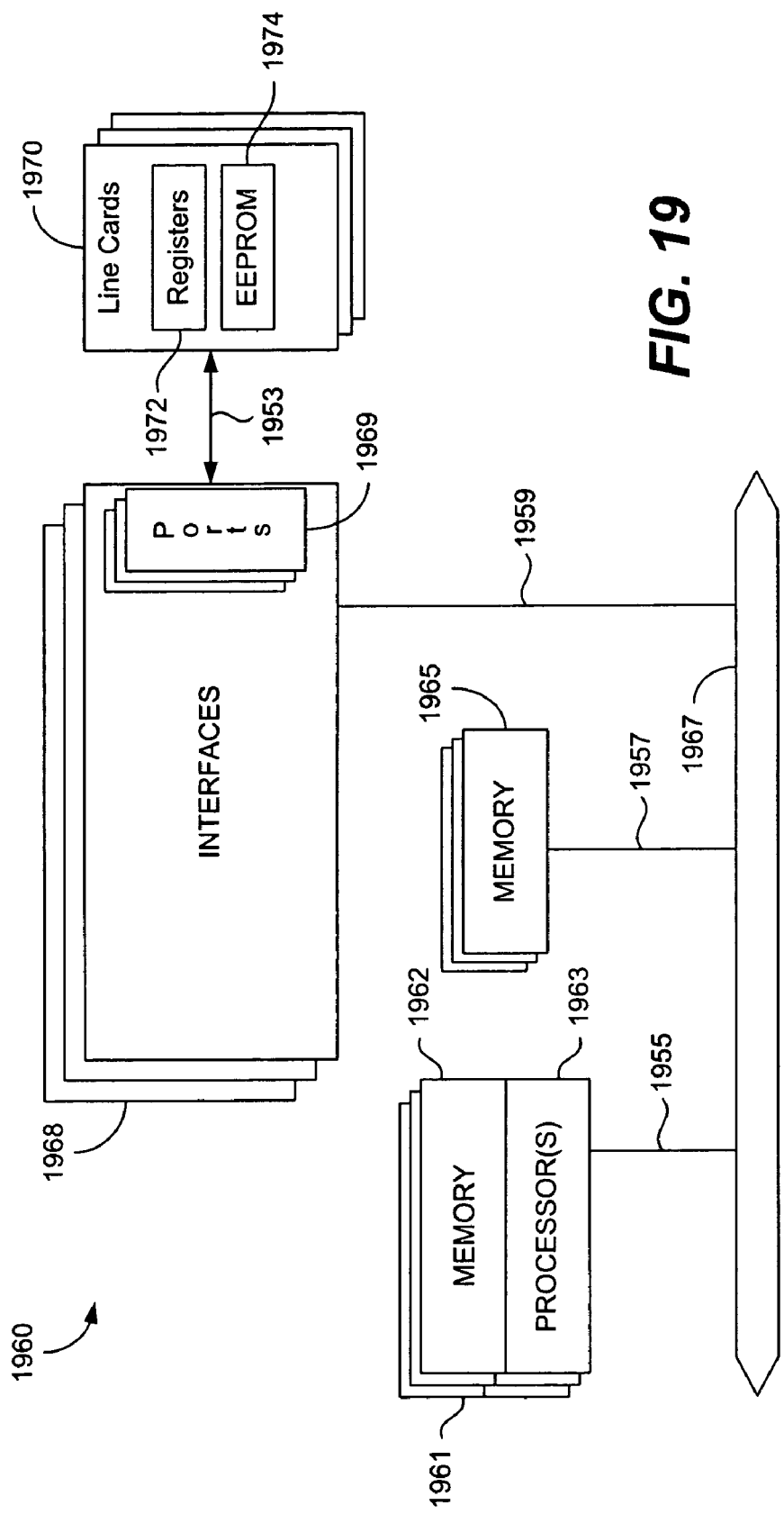
FIG. 19 illustrates a network device that may be configured to perform some methods of the present invention.

FIG. 19 illustrates an example of a network device that may be configured to implement some methods of the present invention. Network device 1960 includes a master central processing unit (CPU) 1962, interfaces 1968, and a bus 1967 (e.g., a PCI bus). Generally, interfaces 1968 include ports 1969 appropriate for communication with the appropriate media. In some embodiments, one or more of interfaces 1968 includes at least one independent processor 1974 and, in some instances, volatile RAM. Independent processors 1974 may be, for example ASICs or any other appropriate processors. According to some such embodiments, these independent processors 1974 perform at least some of the functions of the logic described herein. In some embodiments, one or more of interfaces 1968 control such communications-intensive tasks as media control and management. By providing separate processors for the communications-intensive tasks, interfaces 1968 allow the master microprocessor 1962 efficiently to perform other functions such as routing computations, network diagnostics, security functions, etc.

The interfaces 1968 are typically provided as interface cards (sometimes referred to as "line cards"). Generally, interfaces 1968 control the sending and receiving of data packets over the network and sometimes support other peripherals used with the network device 1960. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1962 may be responsible for implementing specific functions associated with the functions of a desired network device. According to some embodiments, CPU 1962 accomplishes all these functions under the control of software including an operating system (e.g. Linux, VxWorks, etc.), and any appropriate applications software.

CPU 1962 may include one or more processors 1963 such as a processor from the Motorola family of microprocessors or the MIPS family of microprocessors. In an alternative embodiment, processor 1963 is specially designed hardware for controlling the operations of network device 1960. In a specific embodiment, a memory 1961 (such as non-volatile RAM and/or ROM) also forms part of CPU 1962. However, there are many different ways in which memory could be coupled to the system. Memory block 1961 may be used for a variety of purposes such as, for example, caching and/or storing data, programming instructions, etc.

Regardless of network device's configuration, it may employ one or more memories or memory modules (such as, for example, memory block 1965) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 19 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 19) or switch fabric based (such as a cross-bar).

While the invention has been particularly shown and described with reference to specific embodiments thereof, it will be understood by those skilled in the art that changes in the form and details of the disclosed embodiments may be made without departing from the spirit or scope of the invention. For example, some implementations of the invention allow a VL to change from being a drop VL to a no drop VL. Thus, the examples described herein are not intended to be limiting of the present invention. It is therefore intended that the appended claims will be interpreted to include all variations, equivalents, changes and modifications that fall within the true spirit and scope of the present invention.

We claim:

1. A method for carrying more than one type of traffic on a single physical link, the method comprising:
   logically partitioning traffic on a physical link of a network device into a plurality of virtual lanes;
   receiving first traffic into the physical link of the network device, wherein the first traffic indicates a first virtual lane based on the first traffic indicating a protocol that recovers from dropping of the first traffic;
   receiving second traffic into the physical link of the network device, wherein the second traffic indicates a second virtual lane based on the second traffic indicating a protocol that does not recover from dropping of the second traffic;
   applying a first set of rules to the first traffic indicating the first virtual lane, wherein the first set of rules applies a probabilistic drop function to the first traffic in response to latency; and
   applying a second set of rules to the second traffic indicating the second virtual lane, wherein the second set of rules does not cause frames from the second traffic to be dropped in response to latency.

2. The method of claim 1, further comprising the step of differentiating service per virtual lane.

3. The method of claim 1, further comprising the steps of applying third through $N^{th}$ sets of rules to traffic on third through $N^{th}$ virtual lanes.

4. The method of claim 1, wherein the first traffic comprises Ethernet traffic.

5. The method of claim 1, wherein the second traffic comprises storage traffic.

6. The method of claim 1, wherein the second traffic comprises Inter Process Communication traffic.

7. The method of claim 1, wherein the first set of rules causes frames to be dropped in response to latency.

8. The method of claim 1, wherein the first set of rules causes an explicit congestion notification to be transmitted in response to latency.

9. The method of claim 1, wherein the second set of rules causes an explicit congestion notification to be transmitted in response to latency.

10. A method for carrying more than one type of traffic on a single physical link, the method comprising:
    logically partitioning traffic on a physical link of a network device into a plurality of virtual lanes;
    receiving first traffic into the physical link of the network device, wherein the first traffic indicates a first virtual lane based on the first traffic indicating a Fibre Channel protocol that does not recover from dropping of the first traffic;
    receiving second traffic into the physical link of the network device, wherein the second traffic indicates a second virtual lane based on the second traffic indicating an Ethernet protocol that recovers from dropping of the second traffic;
    applying a first set of no-drop rules to Fibre Channel traffic on the first virtual lane; and
    applying a second set of rules to Ethernet traffic on the second virtual lane, wherein the second set of rules causes frames to be dropped to avoid deadlocks.

11. The method of claim 1, further comprising the step of implementing flow control per virtual lane by using one or more of a buffer-to-buffer crediting scheme and PAUSE frames.

12. The method of claim 2, wherein service is differentiated according to one or more of quality of service and access control.

13. The method of claim 8, wherein the explicit congestion notification is sent to one of a source device or an edge device.

14. The method of claim 8, wherein the explicit congestion notification is sent via one of a data frame or a control frame.

15. The method of claim 11, wherein the buffer-to-buffer crediting scheme comprises crediting according to one of frame size and a number of frames.

16. The method of claim 11, wherein buffer-to-buffer credits are indicated via one of a data frame or a control frame.

17. A network device, comprising:
    means for logically partitioning traffic on a physical link into a plurality of virtual lanes;
    means for applying a first set of rules to first traffic on a first virtual lane;
    means for applying a second set of rules to second traffic on a second virtual lane; means for implementing flow control per virtual lane, the flow control comprising one or more of a buffer-to-buffer crediting scheme and the use of PAUSE frames;
    wherein the first traffic comprises Ethernet traffic;
    wherein the second traffic comprises Fibre Channel traffic;
    means for receiving a frame on the physical link;
    means for inspecting one or more fields of the frame; and
    means for determining, based on the one or more fields, whether the first set of rules should apply, or the second set of rules should apply.

18. The network device of claim 17, further comprising means for differentiating service per virtual lane.

19. The network device of claim 17, wherein the second traffic comprises Inter Process Communication traffic.

20. The network device of claim 17, wherein the buffer-to-buffer crediting scheme comprises crediting according to one of frame size and a number of frames.

21. The network device of claim 17, wherein buffer-to-buffer credits are indicated via one of a data frame or a control frame.

22. A non-transitory machine readable storage medium and having computer program instructions stored thereon that are arranged to perform the following operations:
    logically partitioning traffic on a physical link of a network device into a plurality of virtual lanes;
    receiving first traffic into the physical link of the network device, wherein the first traffic indicates a first virtual lane based on the first traffic indicating a protocol that recovers from dropping of the first traffic;
    receiving second traffic into the physical link of the network device, wherein the second traffic indicates a second virtual lane based on the second traffic indicating a protocol that does not recover from dropping of the second traffic;
    applying a first set of rules to the indicating the first virtual lane, wherein the first set of rules applies a probabilistic drop function to the first traffic in response to latency; and
    applying a second set of rules to the second traffic indicating the second virtual lane, wherein the second set of rules does not cause frames from the second traffic to be dropped in response to latency.

23. The machine readable storage medium of claim 22, wherein the computer program instructions are further arranged for differentiating service per virtual lane.

24. The machine readable storage medium of claim 22, wherein the computer program instructions are further arranged for applying third through $N^{th}$ sets of rules to traffic on third through $N^{th}$ virtual lanes.

25. The machine readable storage medium of claim 22, wherein the first traffic comprises Ethernet traffic.

26. The machine readable storage medium of claim 22, wherein the second traffic comprises storage traffic.

27. The machine readable storage medium of claim 22, wherein the second traffic comprises Inter Process Communication traffic.

28. The machine readable storage medium of claim 22, wherein the first set of rules causes frames to be dropped in response to latency.

* * * * *